United States Patent
Yoneya et al.

(10) Patent No.: US 10,890,124 B2
(45) Date of Patent: Jan. 12, 2021

(54) INTERNAL COMBUSTION ENGINE CONTROL DEVICE AND METHOD

(71) Applicant: HITACHI AUTOMOTIVE SYSTEMS, LTD., Hitachinaka (JP)

(72) Inventors: Naoki Yoneya, Tokyo (JP); Masayuki Saruwatari, Tokyo (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 0 days.

(21) Appl. No.: 16/340,923

(22) PCT Filed: Sep. 27, 2017

(86) PCT No.: PCT/JP2017/034943
§ 371 (c)(1),
(2) Date: Apr. 10, 2019

(87) PCT Pub. No.: WO2018/074163
PCT Pub. Date: Apr. 26, 2018

(65) Prior Publication Data
US 2019/0285008 A1    Sep. 19, 2019

(30) Foreign Application Priority Data
Oct. 17, 2016 (JP) ................................. 2016-203254

(51) Int. Cl.
*G06F 1/00* (2006.01)
*F02D 35/02* (2006.01)
(Continued)

(52) U.S. Cl.
CPC ............. *F02D 35/026* (2013.01); *F02D 7/00* (2013.01); *F02D 35/023* (2013.01);
(Continued)

(58) Field of Classification Search
CPC ..... F01P 7/167; F01P 2025/31; F02D 35/025; F02D 35/026; F02D 2200/021; F02D 35/027; G01L 23/22; G01L 23/221
(Continued)

(56) References Cited

U.S. PATENT DOCUMENTS 10,458,310 B2 * 10/2019 Morita .................. F02D 35/025
2003/0070637 A1 * 4/2003 Majima ............... F02D 13/0249
123/90.15
(Continued)

FOREIGN PATENT DOCUMENTS

| JP | 2006-329000 A | 12/2004 |
| JP | 2006-322362 A | 11/2006 |

(Continued)

OTHER PUBLICATIONS

International Search Report with English translation and Written Opinion issued in corresponding application No. PCT/JP2017/034943 dated Nov. 14, 2017.

*Primary Examiner* — John Kwon
(74) *Attorney, Agent, or Firm* — Foley & Lardner LLP

(57) ABSTRACT

Provided is a technique capable of suppressing the amount of fuel adhering to a wall surface of a cylinder in an engine whose wall surface temperature varies every cycle. An internal combustion engine control device that controls an internal combustion engine, which injects fuel into a cylinder and generates combustion by ignition, includes: a wall surface temperature calculation unit that calculates a wall surface temperature of the cylinder based on a pressure in the cylinder; and a combustion control unit that controls the combustion of the internal combustion engine based on the calculated wall surface temperature.

20 Claims, 17 Drawing Sheets

(51) Int. Cl.
*F02D 7/00* (2006.01)
*F02P 5/15* (2006.01)
*F02D 41/40* (2006.01)
*F02P 5/152* (2006.01)
*F02D 41/30* (2006.01)
*F02D 41/00* (2006.01)

(52) U.S. Cl.
CPC ......... *F02D 35/027* (2013.01); *F02D 41/401* (2013.01); *F02D 41/402* (2013.01); *F02P 5/15* (2013.01); *F02P 5/152* (2013.01); *F02D 41/0047* (2013.01); *F02D 41/3029* (2013.01)

(58) Field of Classification Search
USPC .................................................. 123/434, 435
See application file for complete search history.

(56) References Cited

U.S. PATENT DOCUMENTS

| | | | |
|---|---|---|---|
| 2004/0181331 A1* | 9/2004 | Nagaishi | F02D 35/025 |
| | | | 701/104 |
| 2014/0360444 A1* | 12/2014 | Morita | F02D 35/026 |
| | | | 123/41.08 |
| 2018/0113963 A1* | 4/2018 | Kordon | G05B 17/02 |
| 2019/0003411 A1* | 1/2019 | Aso | F02D 35/023 |

FOREIGN PATENT DOCUMENTS

| | | |
|---|---|---|
| JP | 2013-19350 A | 12/2006 |
| JP | 2008-95651 A | 4/2008 |
| JP | 2008-232066 A | 10/2008 |
| JP | 2008-309033 A | 12/2008 |
| JP | 2010-14070 A | 1/2010 |
| JP | 2004-353490 A | 1/2013 |
| JP | 2016-8601 A | 1/2016 |

* cited by examiner

INTERNAL COMBUSTION ENGINE CONTROL DEVICE AND METHOD

TECHNICAL FIELD

The present invention relates to an internal combustion engine control device, and more particularly to a control device that controls an internal combustion engine provided with a fuel injection valve directly injecting fuel into a cylinder.

BACKGROUND ART

Conventionally, gasoline engines that form an air-fuel mixture in a cylinder and burns the air-fuel mixture by ignition or self-ignition have been widely known. As a characteristic feature of such a type of engine, a direct injection technique of injecting fuel directly into a cylinder is known. Since the fuel is directly injected into the cylinder, the air-fuel mixture is cooled by vaporization heat of the fuel, and knocking is suppressed. As the knocking is suppressed, a compression ratio can be improved, and the thermal efficiency of the engine is improved.

However, when the fuel is directly injected into the cylinder, a part of the fuel adheres to a wall surface or a piston so that a fuel-rich air-fuel mixture is locally formed, and the unburned hydrocarbons (unburned HC) included in an exhaust gas after combustion increases. In particular, such an effect is likely to occur immediately after startup in a state where the engine is cold.

PTL 1 is a document that discloses a technique relating to control of the amount of fuel adhering to a wall surface in an internal combustion engine including such a fuel direct injection device. According to the technique disclosed in PTL 1, an equilibrium temperature of a wall body of a cylinder is calculated based on a gas temperature in the cylinder and a cooling water temperature in the internal combustion engine that executes a post injection in order to discharge unburned HC to the outside of the cylinder after a main injection into the cylinder of the internal combustion engine. A wall surface temperature is estimated in consideration of a heat transfer time delay of a system based on the equilibrium temperature of the wall body of the cylinder. Further, the amount of the post injection is controlled based on the estimated wall surface temperature. As a result, the adhesion of fuel to the wall surface is suppressed.

CITATION LIST

Patent Literature

PTL 1: JP 2013-019350 A

SUMMARY OF INVENTION

Technical Problem

The amount of fuel, which has been injected directly into the cylinder, adhering to the cylinder wall surface increases as a temperature of the wall surface of the cylinder (hereinafter referred to as a "cylinder wall surface temperature") decreases. Here, the cylinder wall surface temperature increases or decreases every cycle in a transient operating state such as during warming-up of the engine or rapid deceleration. In addition, a composition and a temperature of the air-fuel mixture before combustion vary every cycle, for example, due to execution of internal exhaust gas recirculation (EGR) that directly draws an exhaust gas from an exhaust port into the cylinder. Accordingly, a composition and a temperature of the gas after combustion also vary every cycle. For example, when the dilution ratio of the air-fuel mixture before combustion in a certain cycle increases due to the variations in the internal EGR rate, the amount of heat generated by combustion decreases. Thus, the temperature of the gas after combustion (hereinafter referred to as a "post-combustion gas") decreases, and as a result, the cylinder wall surface temperature decreases. In addition, a heat transfer coefficient between the post-combustion gas and the wall surface also varies every cycle. For example, when a flow velocity of the post-combustion gas is high and the heat transfer coefficient from the post-combustion gas to the wall surface is improved, the amount of heat transfer from the post-combustion gas to the wall surface increases and the wall surface temperature rises.

In the above-described PTL 1, however, there is no consideration on the variations in the composition and temperature of the post-combustion gas and the variations in the heat transfer characteristics between the post-combustion gas and the wall surface, and the fuel injection amount is calculated based on a map stored in advance based on only the intake air temperature and the cooling water temperature. At this time, when an actual EGR rate of the air-fuel mixture becomes a value higher than a range assumed when setting a map value in a cycle in which the fuel injection amount has decreased due to deceleration or the like, combustion is performed with an air-fuel mixture having a higher dilution rate than assumed. Thus, the wall surface temperature becomes lower than an assumed value. Thus, the amount of fuel adhering to the wall surface increases if a fuel injection using a pattern stored in advance is performed. In this manner, there is a problem that the amount of fuel adhering to the cylinder wall surface increases particularly during a transient operation immediately after starting up the engine from a cold state.

An object of the present invention is to provide a technique capable of suppressing the amount of fuel adhering to a wall surface of a cylinder in an engine whose wall surface temperature varies every cycle.

Solution to Problem

An internal combustion engine control device according to one aspect of the present invention is an internal combustion engine control device controlling an internal combustion engine, which injects fuel into a cylinder and generates combustion by ignition, and includes: a wall surface temperature calculation unit that calculates a wall surface temperature of the cylinder based on a pressure in the cylinder; and a combustion control unit that controls combustion of the internal combustion engine based on the calculated wall surface temperature.

Advantageous Effects of Invention

According to the present invention, the wall surface temperature is calculated based on the pressure in the cylinder and the wall surface temperature is used for control of the internal combustion engine, and thus, it is possible to acquire the wall surface temperature in real time as compared with the case of obtaining the wall surface temperature from the cooling water temperature and to promptly perform the appropriate control.

DESCRIPTION OF EMBODIMENTS

Hereinafter, embodiments of the present invention will be described with reference to the drawings.

First Embodiment

Hereinafter, a configuration and an operation of an internal combustion engine control device according to a first embodiment will be described with reference to FIGS. 1 to 5.

Figure 1:
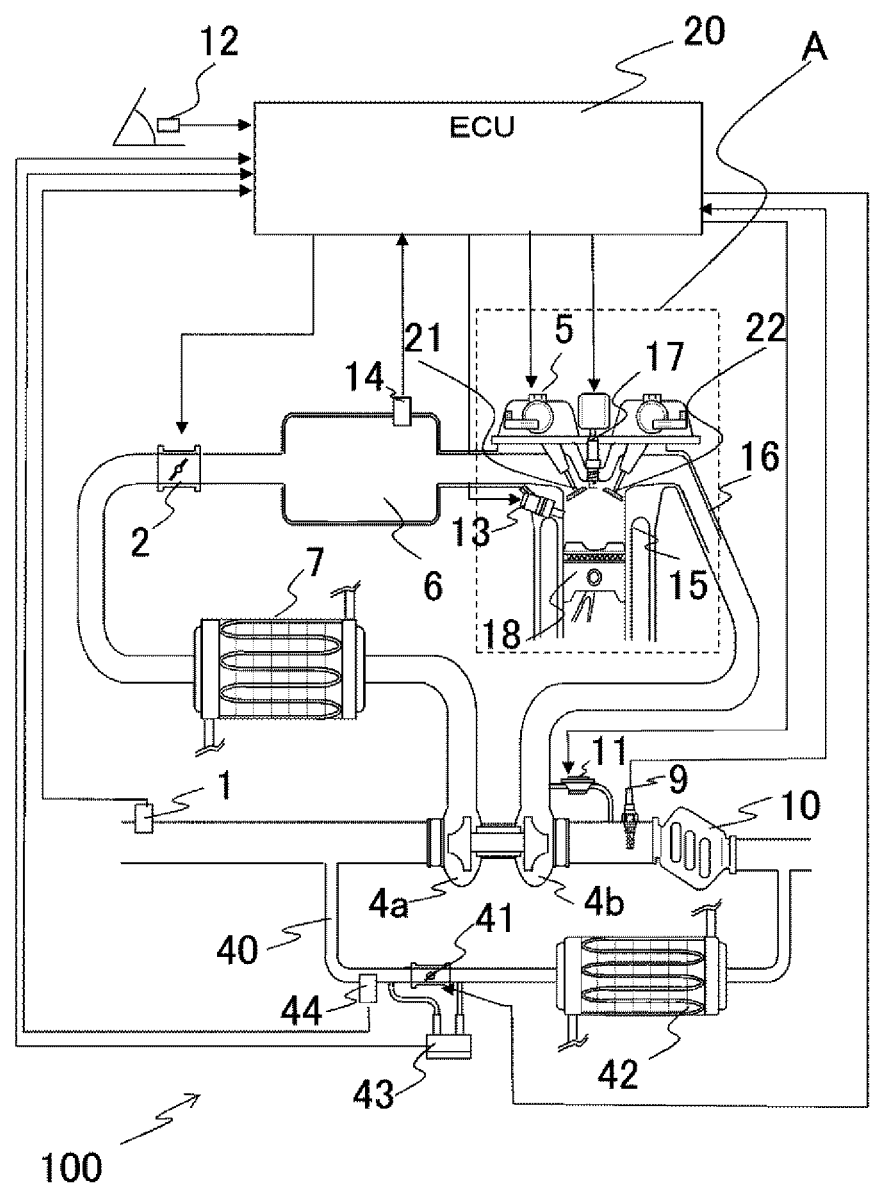
FIG. 1 is a system configuration diagram of a system in which an internal combustion engine control device according to a first embodiment is applied to an in-cylinder injection type gasoline engine for automobiles.
Figure 2:
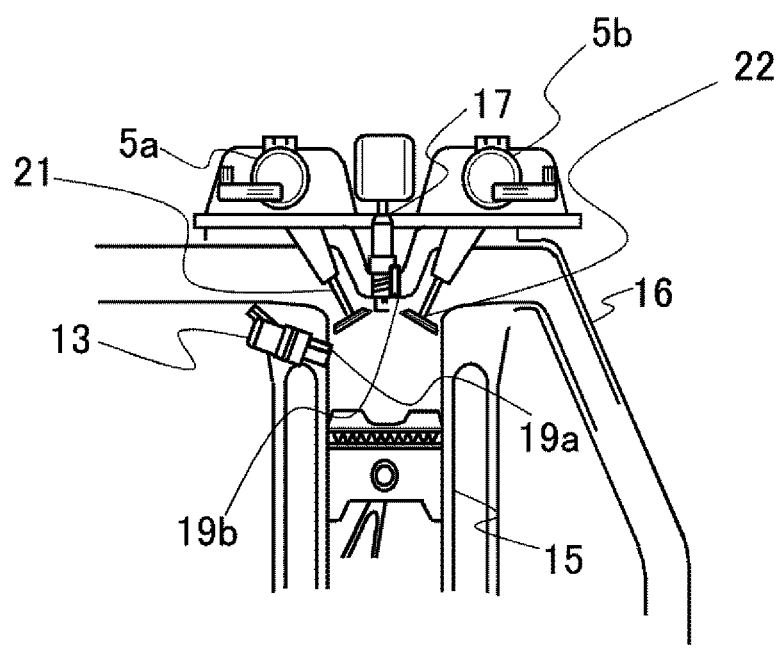
FIG. 2 is an enlarged view of a cylinder portion.

FIG. 1 is a system configuration diagram of a system in which the internal combustion engine control device according to the first embodiment is applied to an in-cylinder injection type gasoline engine for automobiles. FIG. 2 is an enlarged view of a cylinder portion.

An engine 100 is a spark ignition type four-cylinder gasoline engine for automobiles. An air flow sensor 1 measuring an intake air amount, a compressor 4a of a supercharger configured to supercharge intake air, an intercooler 7 configured to cool the intake air, an electronically controlled throttle 2 adjusting a pressure in an intake pipe 6, and an intake pressure sensor 14 measuring the pressure in the intake pipe 6 are provided in the intake pipe 6.

In addition, the engine 100 includes a fuel injection device (hereinafter referred to as an injector) 13 that injects fuel, a piston 18 configured to compress an air-fuel mixture of injected fuel and air, and an ignition plug 17 that supplies ignition energy in each cylinder 15. In addition, the injector 13 is provided with an in-cylinder pressure sensor 19 measuring a pressure inside the cylinder in FIG. 2. The in-cylinder pressure sensor 19 is not necessarily attached to the injector 13. For example, the in-cylinder pressure sensor 19 may be integrated with another device such as the ignition plug 17. In addition, the in-cylinder pressure sensor 19 may be attached to the cylinder 15 as a single body.

In addition, variable valve timing mechanisms 5a (intake side) and 5b (exhaust side), which adjust a gas flowing into the cylinder 15 and a gas discharged from the cylinder 15, respectively, are provided at a cylinder head of the cylinder 15. The variable valve timings 5a and 5b adjust a timing of opening and closing the intake valves 21 and the exhaust valves 22 of all the cylinders from No. 1 to No. 4, thereby adjusting the intake air amount and internal EGR amount.

Although not illustrated, a high-pressure fuel pump configured to supply high-pressure fuel to the injector 13 is connected to the injector 13 by a fuel pipe. In addition, a fuel pressure sensor configured to measure a fuel injection pressure is provided in the fuel pipe.

Further, the exhaust pipe 16 is provided with: a turbine 4b configured to apply a rotational force to the compressor 4a of the supercharger by exhaust energy; an electronically controlled wastegate valve 11 configured to adjust a flow rate of an exhaust gas flowing to the turbine 4b; a three-way catalyst 10 configured to purify the exhaust gas; and an air-fuel ratio sensor 9 which is one aspect of an air-fuel ratio detector and detects an air-fuel ratio of the exhaust gas on the upstream side of the three-way catalyst 10. In addition, a crank shaft is provided with a crank angle sensor configured to calculate a rotation angle although not illustrated.

Further, there is an EGR pipe 40 configured to reflux the exhaust gas from the downstream side of the three-way catalyst 10 of the exhaust pipe 16 to the upstream side of the compressor 4a of the intake pipe 6. In addition, an EGR cooler 42 configured to cool the EGR, an EGR valve 41 configured to control a flow rate of the exhaust gas refluxing in the EGR pipe 40, a differential pressure sensor 43 that detects a differential pressure between back and forth positions of the EGR valve 41, and an EGR temperature sensor 44 that detects a temperature of the EGR pipe 40 are attached to, respectively, appropriate positions of the EGR pipe 40.

Signals indicating sensor values respectively from the air flow sensor 1, the air-fuel ratio sensor 9, the intake pressure sensor 14, the differential pressure sensor 43, and the EGR temperature sensor 44 are sent to an engine control unit (ECU) 20. In addition, an output signal indicating an accelerator opening degree obtained from an accelerator opening degree sensor 12 is sent to the ECU 20. The accelerator opening degree sensor 12 detects a depression amount of an accelerator pedal, that is, an accelerator opening degree.

The ECU 20 calculates a torque (requested torque) requested by a driver based on the output signal of the accelerator opening degree sensor 12. That is, the accelerator opening degree sensor 12 is used as a requested torque detection sensor that detects a torque requested for the engine.

In addition, the ECU 20 calculates rotational speed of the engine based on an output signal indicating a crank angle from the crank angle sensor. The ECU 20 calculates optimum values of major operating amount (combustion parameters) of the engine such as an air flow rate, a fuel injection amount, an ignition timing, and a fuel pressure based on the operating state of the engine obtained from output signals of the above-described various sensors.

The fuel injection amount calculated by the ECU 20 is converted into a valve opening pulse signal and sent to the injector 13. In addition, an ignition signal is sent to the ignition plug 17 such that ignition is performed at the ignition timing calculated by the ECU 20. A throttle opening degree calculated by the ECU 20 is sent to the electronically controlled throttle 2 as a throttle driving signal. A variable valve timing operation amount calculated by the ECU 20 is sent to the variable valve timing 5 as a variable valve timing driving signal. A wastegate valve opening degree calculated by the ECU 20 is sent to the electronically controlled wastegate valve 11 as a wastegate valve driving signal. An EGR valve opening degree that is constantly calculated by the ECU 20 is sent to the EGR valve 41 as an EGR valve opening degree driving signal.

Fuel is injected with respect to air flowing into the cylinder 15 from the intake pipe 6 through the intake valve 21, and the air and fuel are mixed to form the air-fuel mixture. The air-fuel mixture explodes by a spark generated from the ignition plug 17 at a predetermined ignition timing. The piston is pushed down by the pressure in the cylinder generated by the combustion so that a driving force of the engine is generated. Further, an exhaust gas after the explosion is sent to the three-way catalyst 10 through the exhaust pipe 16, harmful components are purified inside the three-way catalyst 10, and the purified gas is discharged to the outside.

Figure 3:
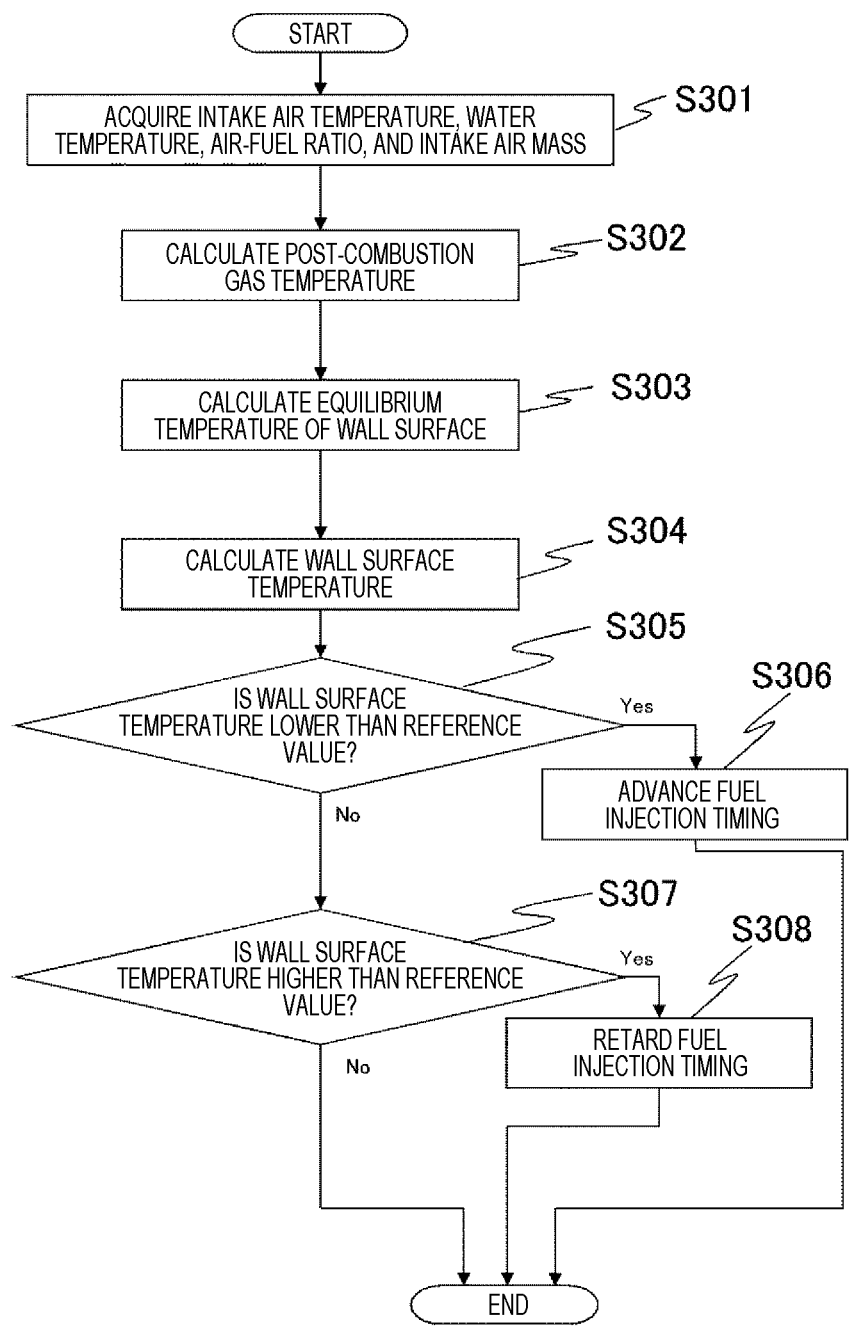
FIG. 3 is a flowchart illustrating an example of a process of correcting and controlling a fuel injection timing by the internal combustion engine control device according to the first embodiment.

FIG. 3 is a flowchart illustrating an example of a process of correcting and controlling the fuel injection timing by the internal combustion engine control device according to the first embodiment. The ECU 20 illustrated in FIG. 1 includes a central processing unit (CPU), which functions as a control unit.

In step S301, the control unit acquires a temperature of intake air (intake air temperature), a temperature of cooling water (water temperature), a ratio of air and fuel of a mixed gas (air-fuel ratio), and a mass of intake air (intake air mass) from the respective sensors. In step S302, the control unit obtains a temperature of a post-combustion gas based on the intake air temperature, the air-fuel ratio, and the intake air mass. In step S303, the control unit calculates an equilibrium temperature of the wall surface of the cylinder 15 when the post-combustion gas and the cooling water are held based on the water temperature and heat transfer characteristics inside the cylinder estimated in advance. Here, the wall surface temperature which is the temperature of the wall surface of the cylinder 15 does not immediately reach the equilibrium temperature, and thus, the control unit obtains a time response delay of the wall surface temperature in accordance with a heat capacity of a system in order to consider a temporal delay of a change of the wall surface temperature in step S304. The heat transfer characteristics and heat capacity inside the cylinder may be obtained by numerical analysis and used or may be used in the state of a map of analysis or experiment results.

In addition, the control unit of the ECU 20 compares the wall surface temperature obtained in consideration of the time response delay with a reference value in step S305. This reference value is a temperature value obtained by analysis or an experiment of a wall surface temperature at which the exhaust gas is minimized under the above operating conditions. When the wall surface temperature is lower than the reference value, the control unit advances the fuel injection timing in step S306. Next, the control unit compares the wall surface temperature with the reference value again in step S307, and retards the fuel injection timing when the wall surface temperature is higher than the reference value.

Here, the wall surface temperature of the cylinder 15 increases or decreases every cycle in a transient operating state such as during warming-up of the engine or rapid deceleration. In addition, a composition and a temperature of the air-fuel mixture before combustion vary every cycle due to implementation of internal EGR which pulls the exhaust gas directly from the exhaust port into the cylinder, and accordingly, a composition and a temperature of the post-combustion gas also vary every cycle. For example, when a dilution ratio of the air-fuel mixture before combustion in a certain cycle increases due to the variation in an internal EGR rate, the amount of heat generated by combustion decreases, and thus, the temperature of the post-combustion gas decreases, and as a result, the wall surface temperature also decreases. In addition, the heat transfer coefficient between the post-combustion gas and the wall surface also varies every cycle, and the amount of heat transfer from the post-combustion gas to the wall surface increases and the wall surface temperature rises, for example, when a flow velocity of the post-combustion gas is high and the heat transfer coefficient from the post-combustion gas to the wall surface is improved.

In the conventional control, however, neither variations in the composition and temperature of the post-combustion gas every cycle nor variations in heat transfer characteristics between the post-combustion gas and the wall surface are taken into consideration, and the wall surface temperature is calculated using a map stored in advance based on sensor values, such as an intake air temperature, a water temperature, and an air-fuel ratio, with which it is difficult to detect variations for each cycle in terms of time resolution. When the actual EGR rate of the air-fuel mixture becomes higher than a value that has been assumed at the time of defining a map value n a cycle in which the fuel injection amount has decreased due to deceleration or the like, the wall surface temperature becomes lower than an estimation result due to highly diluted combustion more than assumed. Thus, when a fuel injection is performed with a pattern stored in advance, the amount of fuel adhering to the wall surface increases. In this manner, there is a problem that the amount of fuel adhering to the wall surface of the cylinder 15 increases, particularly during the transient operation such as immediately after startup.

Figure 4:
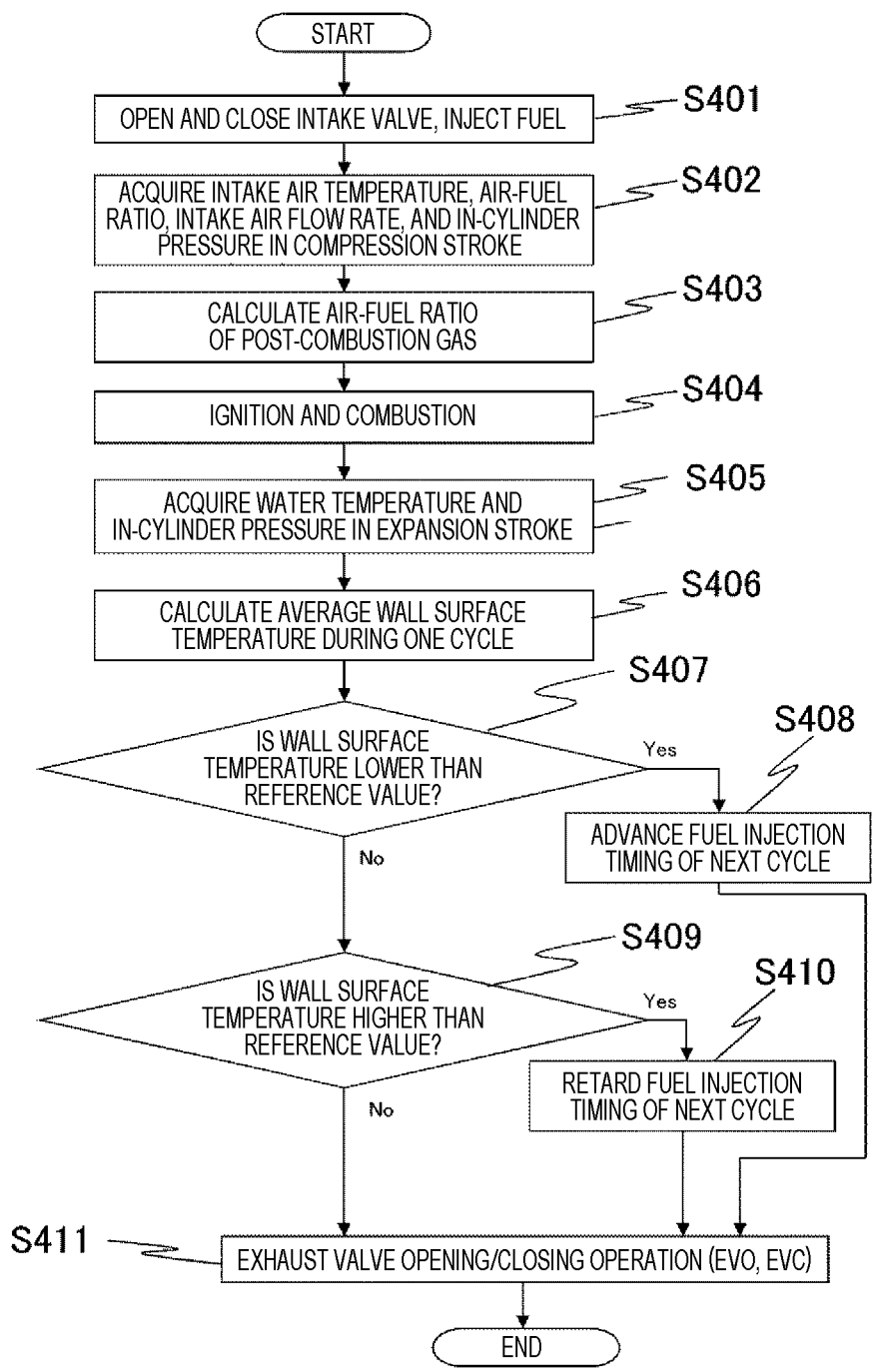
FIG. 4 is a flowchart illustrating an example of control to correct the fuel injection timing during one cycle according to the first embodiment.

FIG. 4 is a flowchart illustrating an example of control to correct the fuel injection timing during one cycle according to the first embodiment.

In step S401, the intake valve is opened (IVO) so that intake is performed, fuel is injected into the cylinder during an intake stroke, and the intake valve is closed (IVC) so that compression is started. The fuel injection timing is generally set to around 60 degree after a top dead center of the intake stroke.

In step S402, the control unit acquires the intake air temperature, the air-fuel ratio, and the intake air flow rate from the respective sensors and acquires a measurement value of the in-cylinder pressure in a compression stroke.

In step S403, the control unit estimates a temperature and a composition of the air-fuel mixture based on the measurement value of the in-cylinder pressure acquired in step S402. Further, the control unit estimates a specific heat ratio of the post-combustion gas based on the estimation results of the temperature and composition of the air-fuel mixture.

In step S404, ignition is performed by the ignition plug 17, combustion starts and the in-cylinder pressure reaches a peak.

In step S405, the control unit acquires a water temperature with the temperature sensor and acquires a measurement value of the in-cylinder pressure in an expansion stroke.

In step S406, the control unit calculates an average value of the wall surface temperature during one cycle based on the value acquired in step S405. The water temperature is generally below 100° C. and an average temperature of a combustion gas during one cycle is between 400 and 600° C. The average value of the wall surface temperature during one cycle varies within a range between the water temperature and the temperature of the combustion gas.

In step S407, the control unit of the ECU 20 compares the obtained average value of the wall surface temperature during one cycle with a reference value. This reference value is a value obtained by analysis or an experiment of a wall surface temperature at which the exhaust is minimized under a predetermined operating condition. When the wall surface temperature is lower than the reference value, the control unit advances the fuel injection timing in the next cycle in step S408. When the fuel injection timing is advanced, fuel is injected at an initial stage of the intake stroke in which a flow velocity of fresh air flowing into the cylinder 15 is fast. Thus, the injected fuel is prevented from adhering to the wall surface due to the fresh air descending along the wall surface of the cylinder 15.

In addition, the wall surface temperature varies even within one cycle, and the wall surface heated by combustion in a previous cycle is cooled by the fresh air and cooling water in the intake stroke, and thus, the wall surface temperature decreases every moment along with the descending of the piston. Thus, the wall surface temperature in the first half of the intake stroke is relatively higher than that in the second half. Therefore, when the fuel injection timing is advanced, the adhesion of the fuel on the wall surface is suppressed even if the wall surface temperature rises when the fuel collides with the wall surface.

An emission amount of exhaust components (harmful components) caused by a change of the combustion injection timing is obtained for each wall surface temperature by numerical analysis or experiment, and an advancement amount of the fuel injection timing at which the exhaust components are minimized is obtained as the advancement amount of the fuel injection timing. Alternatively, a relationship between the wall surface temperature and the advancement amount of the fuel injection timing suitable for the wall surface temperature may be mapped in advance.

In step S409, the control unit compares the wall surface temperature with the reference value. When the wall surface temperature is higher than the reference value, the control unit retards the fuel injection timing in the next cycle in step S410.

Although the adhesion of fuel to the wall surface is suppressed if the fuel injection timing is advanced, a mixed state of fuel and air deteriorates in the case of excessive advancement, and a locally lean or rich region is formed in the air-fuel mixture. For example, if the entire fuel is injected immediately after the top dead center, the fresh air that has flown into the cylinder in the second half of the intake stroke is short of fuel with respect to a stoichiometric air-fuel ratio, thereby forming a lean state. When a vicinity of the ignition plug in an upper part of the cylinder becomes lean, formation of flame kernel after ignition is hindered. As a result, stability of combustion deteriorates so that fuel consumption deteriorates.

Conversely, when a lower part of the cylinder becomes lean, the air-fuel mixture in the lower part of the cylinder is not sufficiently cooled by vaporization heat of the fuel, and a temperature of an end gas portion rises so that knocking is likely to occur. Then, it is difficult to perform ignition at the ignition timing at which fuel consumption is optimized.

When the wall surface temperature is higher than the reference value, the combustion stability can be improved by retarding the fuel injection timing. It is possible to perform the ignition at the ignition timing at which the fuel consumption is optimized while minimizing the exhaust, and it is possible to reduce the exhaust and fuel consumption. A target retardation amount of the fuel injection timing is obtained by numerical analysis or an experiment of fuel consumption according to a change in the combustion injection timing for each wall surface temperature so as to obtain a fuel injection timing advancement amount at which the fuel consumption becomes fuel economy. Alternatively, a relationship between the wall surface temperature and the fuel injection timing advancement amount may be mapped in advance in advance.

Thereafter, in step S411, the exhaust valve is opened (EVO) so that the post-combustion gas is exhausted, the exhaust valve is closed (EVC), and one cycle is completed.

In this manner, it becomes possible to reduce the exhaust and the fuel consumption in accordance with the wall surface temperature changing every moment during the transient operation by changing the fuel injection timing based on the estimation result of the wall surface temperature.

Figure 5:
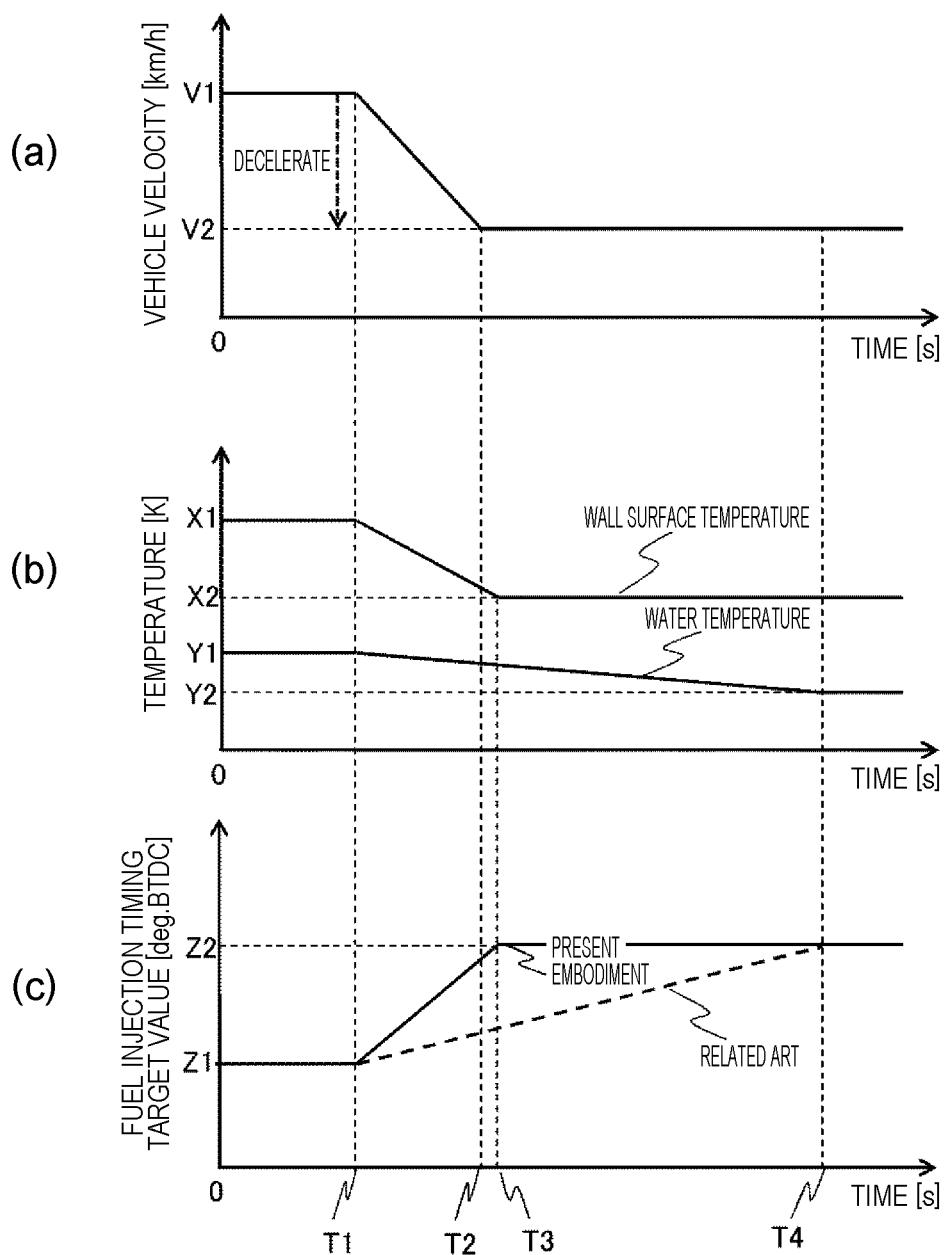
FIG. 5 is a time chart illustrating temporal changes of a vehicle velocity, a wall surface temperature, a water temperature, and a fuel injection timing target value in the internal combustion engine control device according to the first embodiment.

FIG. 5 is a time chart illustrating temporal changes of a vehicle velocity, the wall surface temperature, the water temperature, and a fuel injection timing target value in the internal combustion engine control device according to the first embodiment. Here, a description will be given by exemplifying control when the vehicle velocity decelerates from a velocity $V_1$ to a velocity $V_2$.

Referring to FIG. 5(a), a vehicle equipped with the internal combustion engine control device according to the present embodiment runs on a flatland at the constant velocity $V_1$, starts to decelerate at a certain time $T_1$, and decelerates to the constant velocity $V_2$ at a time $T_2$. At this time, the amount of heat generated inside the engine decreases due to a decrease of rotational speed or a load. Since the wall surface temperature changes depending on the amount of heat generated inside the engine, the wall surface temperature decreases when the vehicle decelerates.

Referring to FIG. 5(b), the wall surface temperature being $X_1$ at the time $T_1$ decreases to $X_2$ at a time $T_3$. In addition, the water temperature gradually decreases along with a degrease of the amount of heat generated in the engine. The water temperature being $Y_1$ at the time $T_1$ decreases to $Y_2$ at a time $T_4$.

It is assumed that a fuel injection timing at which exhaust is minimized when the wall surface temperature is $X_1$ is $Z_1$ and a fuel injection timing at which the exhaust is minimized when the wall surface temperature is $X_2$ is $Z_2$.

Here, in FIG. 5(c), a following delay time $(T_3-T_2)$ of the wall surface temperature with respect to a change in the amount of heat generated in the engine, which is used in the present embodiment, is compared with a following delay time $(T_4-T_2)$ of the water temperature which is conventionally used. The following delay time of the water temperature is significantly longer than the following delay time of the wall surface temperature. This is because the cooling water flows outside the cylinder and it takes time until a change in the amount of heat generated in the engine is reflected as a change in the water temperature. Thus, conventionally, the completion of control of changing the fuel injection timing target value is delayed by the time $T_4$, and it is difficult to set the fuel injection timing to the timing at which the exhaust is minimized between the time $T_2$ and the time $T_4$.

On the other hand, in the case of the present embodiment, the following delay caused by combustion variations or the like accompanying the change in the vehicle velocity occurs for the wall surface temperature, but the following delay time of the wall surface temperature is shorter than the following delay time of the water temperature. In addition, the internal combustion engine control device of the present embodiment can estimate the wall surface temperature can be estimated every cycle by measuring an in-cylinder pressure every cycle so that it is possible to control the injection timing with the short following delay as illustrated in the time chart of FIG. 5(c).

Incidentally, the case where the vehicle decelerates has been described as an example here, but it is possible to control the fuel injection timing with the short following delay by estimating the wall surface temperature following an increasing amount of heat generated in an engine in the same manner even during acceleration.

As the wall surface temperature varying every cycle is estimated and the fuel injection timing of the next and subsequent cycles is controlled every cycle in this manner, it is possible to adjust the air flow when the fuel reaches the vicinity of the wall surface, and it is possible to reduce the amount of fuel adhering to the wall surface of the cylinder 15 even during the transient operation and to reduce the exhaust.

Second Embodiment

Although the example in which the fuel injection timing is controlled as the combustion parameter in the internal combustion engine control has been described in the first embodiment, an example of controlling the number of fuel injections will be described in the second embodiment. An embodiment of a configuration and an operation of an internal combustion engine control device in a case of correcting the number of fuel injections by a control unit of the ECU 20 will be described with reference to FIGS. 6 to 8. A description regarding the same configuration as that of the first embodiment will be omitted.

Figure 6:
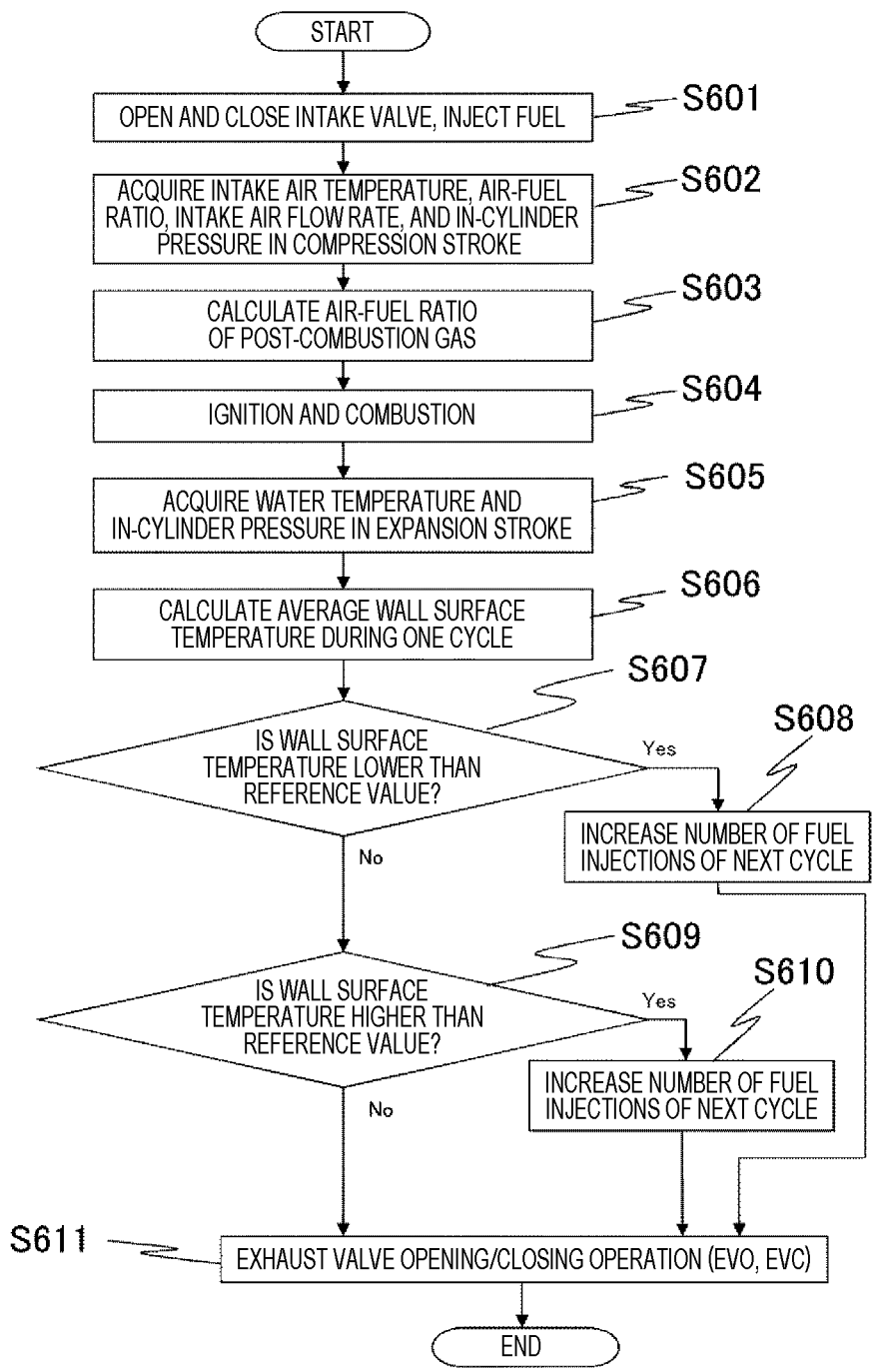
FIG. 6 is a flowchart illustrating an example of a process of correcting and controlling the number of fuel injections during one cycle according to a second embodiment.

FIG. 6 is a flowchart illustrating an example of a process of correcting and controlling the number of fuel injections during one cycle according to a second embodiment. Step S601 to step S607 are the same as steps S401 to S407 in FIG. 4, and thus, detailed descriptions thereof will be omitted.

In the present embodiment, when a wall surface temperature is lower than a reference value, the control unit increases the number of fuel injections in the next cycle in step S608. When increasing the number of fuel injections, a fuel injection amount per one-time injection decreases, fuel penetration decreases so that adhesion of the injected fuel to the wall surface is suppressed.

In addition, the control unit compares the wall surface temperature with the reference value in step S609, and decreases the number of fuel injections in the next cycle in step S610 when the wall surface temperature is higher than the reference value.

When the number of fuel injections is increased, the adhesion of fuel to the wall surface is suppressed, but the fuel penetration decreases if the number of fuel injections is increased to an excessively large number of times so that a mixed state of fuel and air deteriorates, and a locally lean or rich region is formed in an air-fuel mixture. As a result, combustion stability deteriorates and fuel consumption deteriorates.

When the wall surface temperature is higher than the reference value, the stability of combustion is improved if the number of fuel injections is decreased, it is possible to set an ignition timing to a timing at which the fuel consumption is optimized while minimizing the exhaust, and it is possible to reduce the exhaust and fuel consumption. A target number as the number of fuel injections is obtained by numerical analysis or an experiment of a discharge amount of exhaust components caused by a change in the number of combustion injections for each wall surface temperature, and it is possible to obtain the number of fuel injections at which the exhaust is minimized. Alternatively, a relationship between the wall surface temperature and the number of fuel injections may be mapped in advance in advance. Thereafter, in step S611, an exhaust valve is opened so that a post-combustion gas is exhausted, the exhaust valve is closed, and one cycle is completed.

Figure 7:
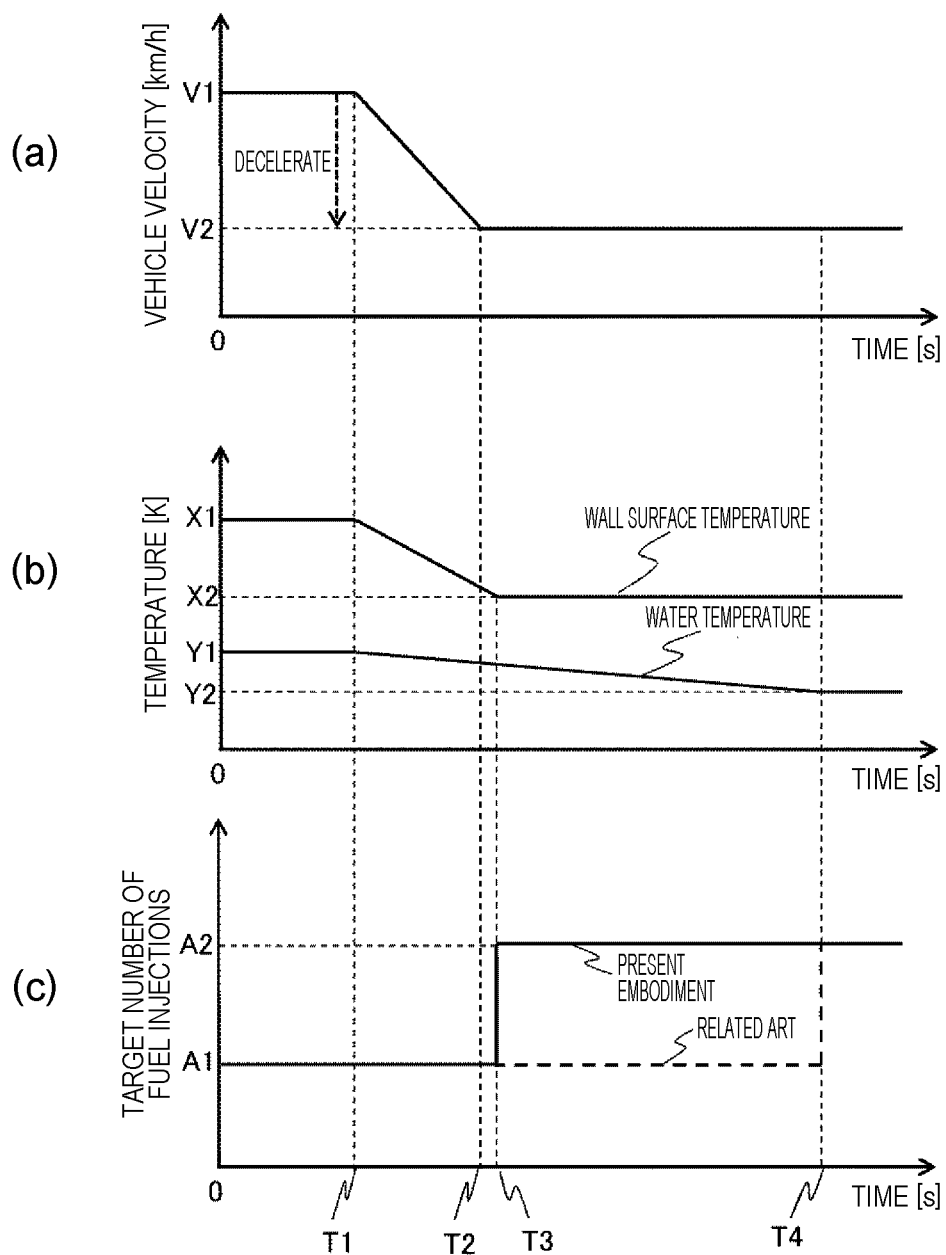
FIG. 7 is a time chart illustrating temporal changes of a vehicle velocity, a wall surface temperature, a water temperature, and the target number of fuel injections in an internal combustion engine control device according to the second embodiment.

FIG. 7 is a time chart illustrating temporal changes of a vehicle velocity, a wall surface temperature, a water temperature, and the target number of fuel injections in the internal combustion engine control device according to the second embodiment.

In the present embodiment, a description will be given by exemplifying control when the vehicle velocity decreases from a velocity $V_1$ to $V_2$. The temporal changes of the vehicle velocity, the wall surface temperature, and the water temperature are the same as those in FIG. 5, and thus, detailed descriptions thereof will be omitted.

It is assumed that the number of fuel injections with which the exhaust is minimized when the wall surface temperature is $X_1$ is $A_1$ and the number of fuel injections with which the exhaust is minimized when the wall surface temperature is $X_2$ is $A_2$.

In the conventional control, the number of fuel injections is changed at a time $T_4$, and it is difficult to select the number of fuel injections with which the exhaust is minimized between a time $T_2$ and the time $T_4$. On the other hand, a following delay time is shorter for the wall surface temperature than that for the water temperature. The internal combustion engine control device of the present embodiment can estimate the wall surface temperature can be estimated every cycle by measuring an in-cylinder pressure every cycle so that it is possible to control the number of fuel injections with the short following delay time as illustrated in the time chart of FIG. 7(c).

Figure 8:
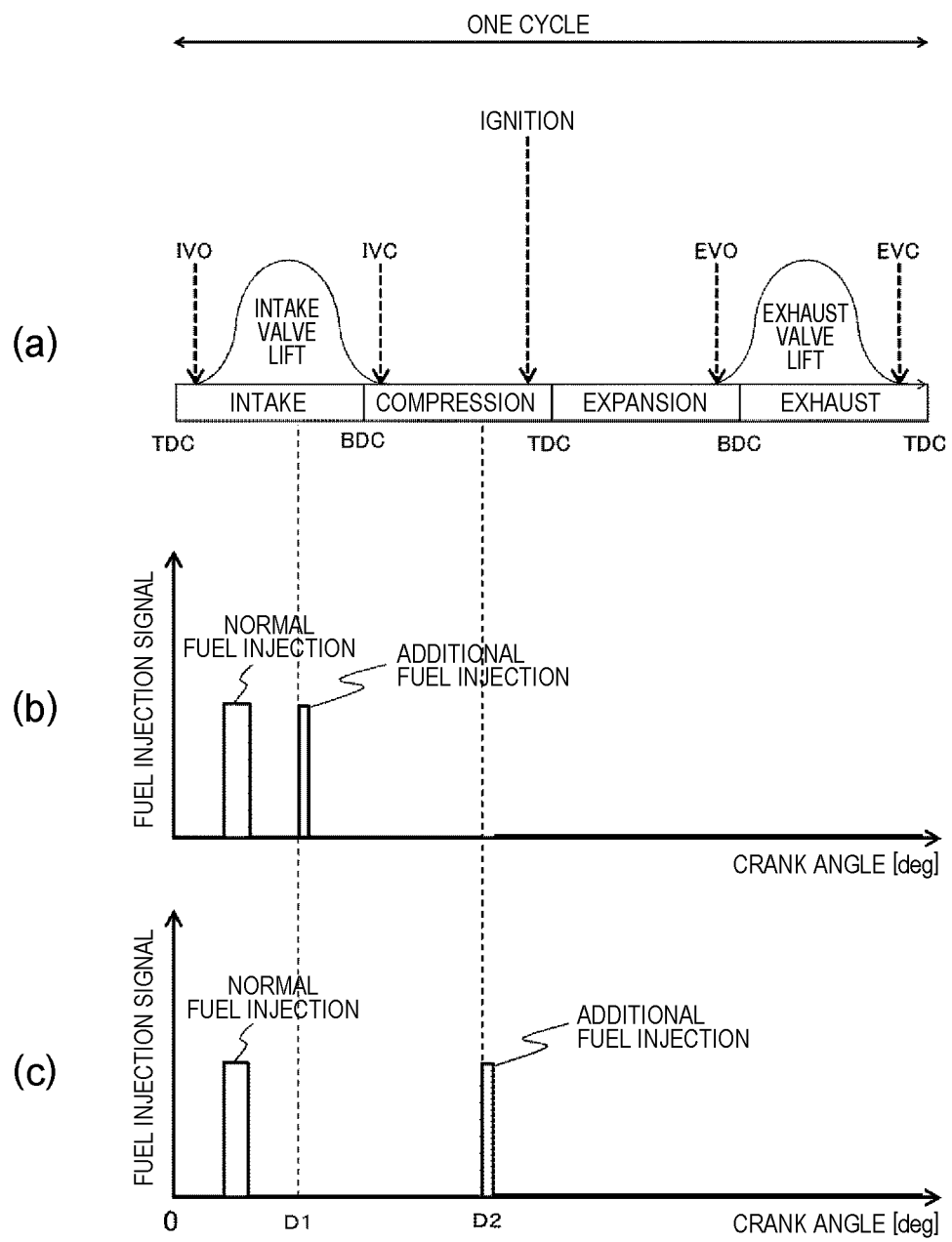
FIG. 8 is a time chart illustrating an example of operations of intake and exhaust valves during one cycle, and a fuel split injection pattern in the internal combustion engine control device according to the second embodiment.

FIG. 8 is a time chart illustrating an example of operations of intake and exhaust valves during one cycle, and a fuel split injection pattern in the internal combustion engine control device according to the second embodiment.

FIG. 8(a) illustrates lifts of the intake valve 21 and the exhaust valve 22. A fuel injection signal in FIGS. 8(b) and 8(c) illustrates a fuel injection pattern according to the present embodiment, and indicates that fuel is injected when a value thereof is not zero. When a fuel injection timing in an intake stroke is advanced, adhesion of fuel to the wall surface is suppressed, but fresh air that has flown into a cylinder in the second half of the intake stroke is short of fuel with respect to a stoichiometric air-fuel ratio so as to form a lean state if the fuel injection timing is excessively advanced.

FIG. 8(b) illustrates the fuel injection timing in the case of performing a plurality of fuel injections using a split injection in the intake stroke. When a vicinity of an ignition plug in an upper part of the cylinder becomes lean, formation of flame kernel after ignition is hindered, and fuel consumption deteriorates due to deterioration of combustion stability. Therefore, an additional fuel injection is performed during the intake stroke in addition to the conventional fuel injection. As the additional fuel injection is performed in the second half of the intake stroke, a sufficient amount of fuel is mixed with fresh air flowing into the cylinder in the second half of the intake stroke so that it is possible to suppress formation of a lean region.

FIG. 8(c) illustrates the fuel injection timing in the case of performing a plurality of fuel injections using a split injection to be divided into the intake stroke and a compression stroke. When a lower part of the cylinder becomes lean, an air-fuel mixture in the lower part of the cylinder is not sufficiently cooled by vaporization heat of fuel, and a temperature of an end gas portion rises so that knocking is likely to occur. Then, it is difficult to set the ignition timing to the timing at which the fuel consumption is optimized, and the fuel consumption deteriorates.

Therefore, an additional fuel injection is performed during the compression stroke in addition to the fuel injection during a conventional intake stroke. As fuel is injected into the cylinder during the compression stroke, the gas temperature decreases due to the vaporization heat of the fuel, and it is possible to obtain an effect of suppressing knocking. As described above, it is possible to improve the combustion stability by performing the additional fuel injection on the IVO side or the compression stroke side based on an estimation result of the wall surface temperature. Then, a fuel consumption optimum ignition timing can be obtained while minimizing the exhaust, and it is possible to reduce the exhaust and fuel consumption.

Although the case where the vehicle decelerates has been described as an example here, it is possible to control the number of injections synchronized with the wall surface temperature by estimating the wall surface temperature that rises following an increasing amount of heat generated in an engine in the same manner even during acceleration. In addition, the number of fuel injections may be set to be more than twice.

In this manner, it is possible to adjust the penetration of injected fuel and the mixed state by changing the number of fuel injections based on the estimation result of the wall surface temperature, and it is possible to minimize the exhaust and fuel consumption by the control in accordance with the wall surface temperature that changes every moment during a transient operation.

Third Embodiment

In a third embodiment, an embodiment of a configuration and an operation of an internal combustion engine control device in a case where a control unit of the ECU 20 controls a ratio of an injection amount in a fuel split injection as a combustion parameter will be described with reference to FIGS. 9 to 11. A description regarding the same configuration as that of the first embodiment will be omitted.

Figure 9:
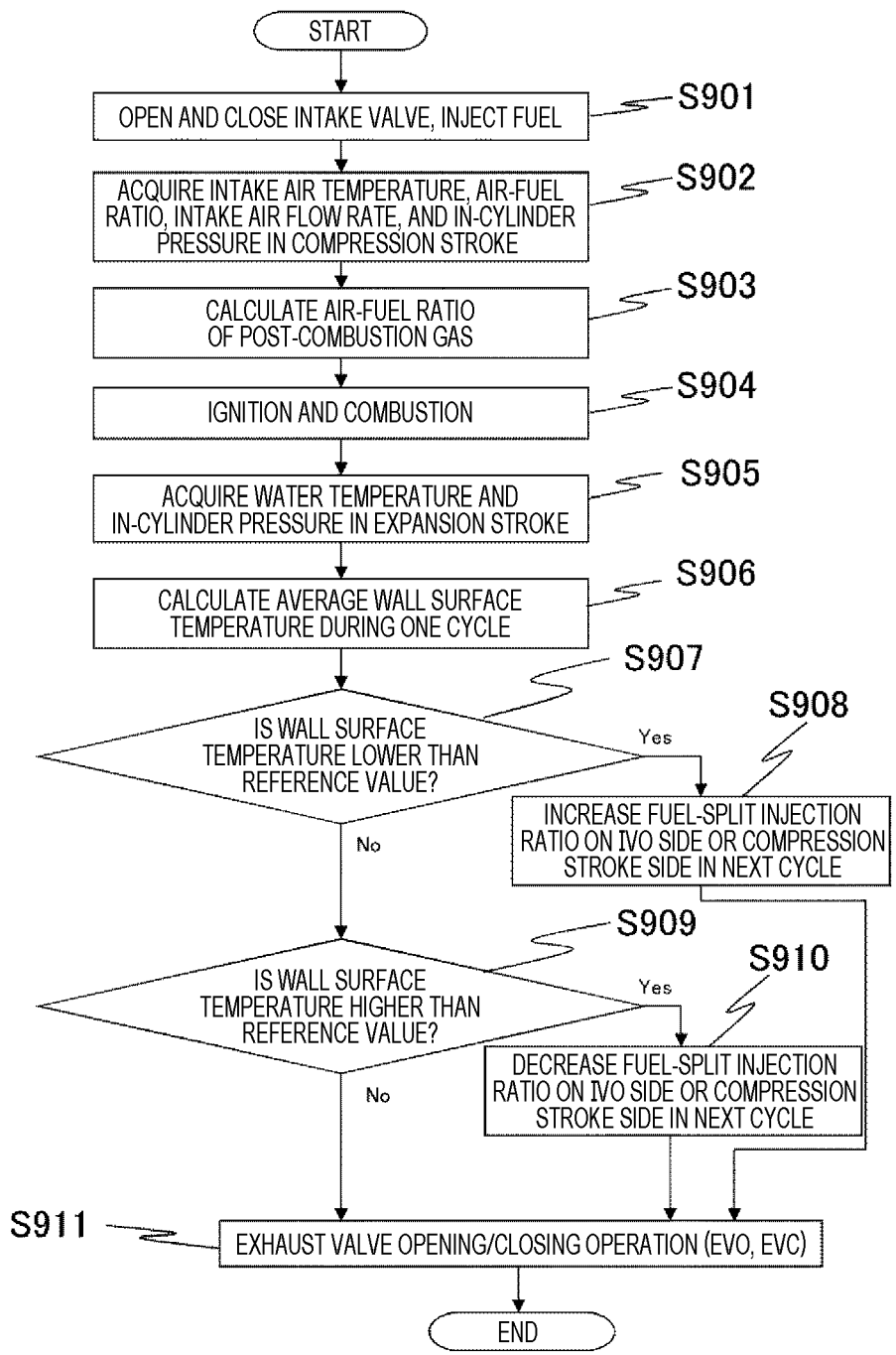
FIG. 9 is a flowchart illustrating an example of a process of correcting and controlling a fuel split injection ratio during one cycle according to a third embodiment.

FIG. 9 is a flowchart illustrating an example of a process of correcting and controlling a fuel split injection ratio during one cycle according to the third embodiment. In the split injection of fuel, fuel that needs to be injected in one cycle is distributed to a plurality of fuel injections at an appropriate ratio. The present embodiment is an example of controlling such a split injection ratio. Steps S901 to S907 are the same as steps S401 to S407 in FIG. 4, and thus, detailed descriptions thereof will be omitted.

In the present embodiment, when a wall surface temperature is lower than a reference value, the control unit increases a ratio of fuel to be injected on an IVO side or a compression stroke side in a fuel split injection of the next cycle, that is, a fuel injection on a temporally rear side in step S908.

First, when a plurality of (for example, two) fuel injections of fuel split injections are performed during an intake stroke, a ratio of fuel of a fuel injection on the IVO side among the plurality of fuel injections is increased. When a fuel injection amount on the IVO side is increased, a ratio of fuel to be injected at an initial stage of the intake stroke in which a flow velocity of fresh air flowing into a cylinder is fast increases, and thus, the amount of fuel adhering to the wall surface among the injected fuel decreases due to the fresh air descending along the cylinder wall surface.

In addition, when a plurality of (for example, two) fuel injections of fuel split injections are performed in the intake stroke and a compression stroke, a ratio of fuel to be injected during the fuel injection in the compression stroke is increased. As fuel is injected into the cylinder during the compression stroke, a gas temperature decreases due to vaporization heat of the fuel, and it is possible to obtain an effect of suppressing knocking. Thus, it is possible to select an ignition timing that optimizes fuel consumption while minimizing exhaust, and it is possible to reduce the exhaust and fuel consumption.

In addition, the control unit compares the wall surface temperature with the reference value in step S909, and decreases the ratio of fuel to be injected during the fuel injection on the IVO side or the compression stroke side in the fuel split injection of the next cycle in step S910 if the wall surface temperature is higher than the reference value.

If the ratio of fuel for the fuel injection on the IVO side or the compression stroke side is excessively increased, a mixed state of fuel and air deteriorates so that a locally lean or rich region is formed in an air-fuel mixture. As a result, stability of combustion deteriorates and fuel consumption deteriorates. Therefore, when the wall surface temperature is high, the combustion can be stabilized by decreasing the ratio of fuel to be injected during the fuel injection on the IVO side or the compression stroke side. Then, it is possible to select an ignition timing that optimizes fuel consumption while minimizing exhaust, and it is possible to reduce the exhaust and fuel consumption.

A target split ratio of fuel in the split injection is obtained in advance by numerical analysis or an experiment of a discharge amount of the exhaust components caused by a change in the ratio of the combustion injection for each wall surface temperature, and it is preferable to obtain the ratio of the fuel injection with which the exhaust is minimized. Alternatively, a relationship between the wall surface temperature and the fuel injection ratio may be mapped in advance in advance. Thereafter, in step S1011, an exhaust valve is opened so that a post-combustion gas is exhausted, the exhaust valve is closed, and one cycle is completed.

Figure 10:
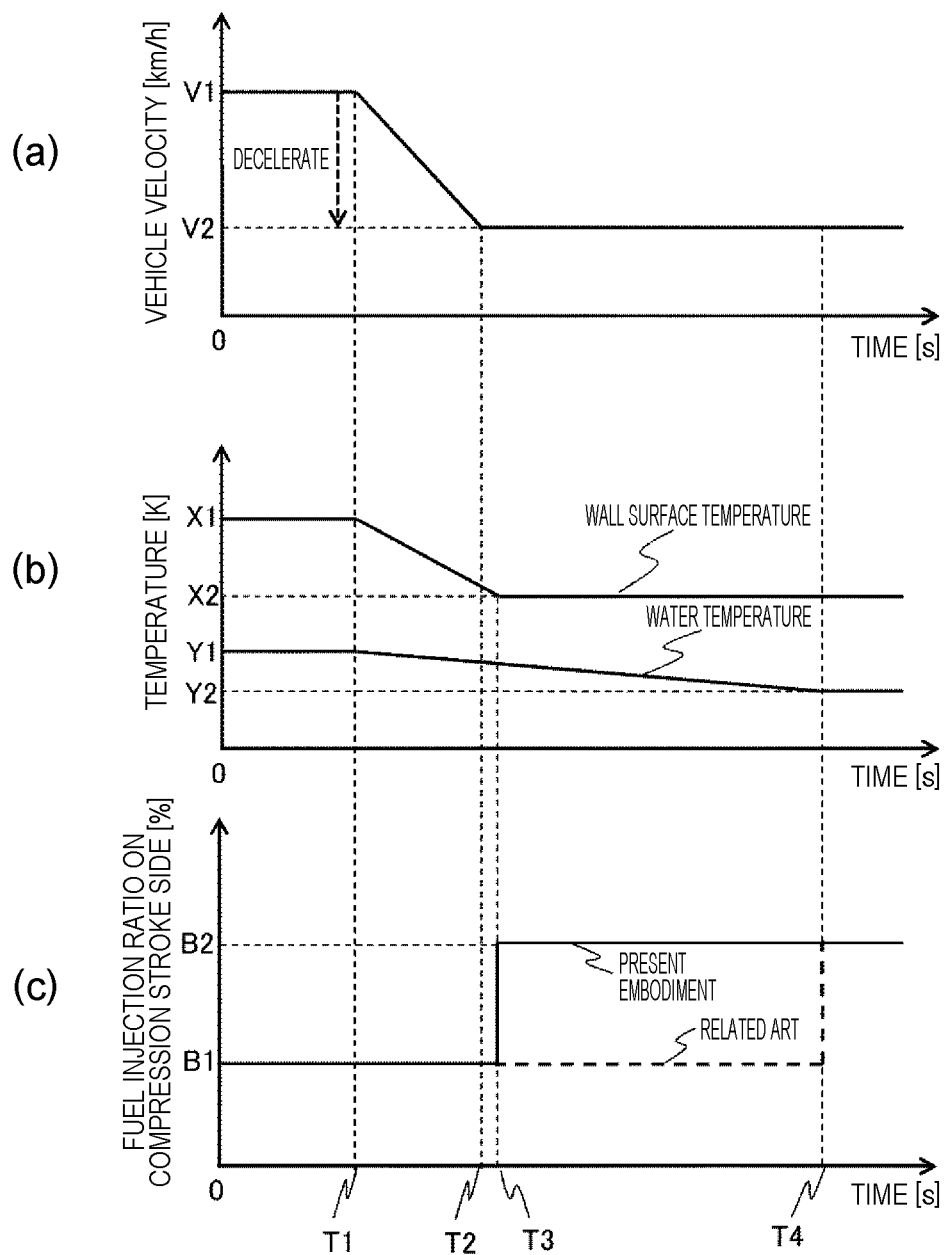
FIG. 10 is a time chart illustrating temporal changes of a vehicle velocity, a wall surface temperature, a water temperature, and a fuel injection ratio target value on a compression stroke side in an internal combustion engine control device according to the third embodiment.

FIG. 10 is a time chart illustrating temporal changes of a vehicle velocity, the wall surface temperature, a water temperature, and a fuel injection ratio target value on the compression stroke side in the internal combustion engine control device according to the third embodiment. A fuel injection signal in FIGS. 10(b) and 10(c) indicates that fuel is injected when a value thereof is not zero and a fuel injection amount increases as a lateral width thereof increases.

In the present embodiment, a description will be given by exemplifying control when the vehicle velocity decreases from a velocity $V_1$ to $V_2$. The temporal changes of the vehicle velocity, the wall surface temperature, and the water temperature are the same as those in FIG. 5, and thus, detailed descriptions thereof will be omitted. It is assumed that the fuel injection ratio on the compression stroke side with which the exhaust is minimized when the wall surface temperature is $X_1$ is $B_1$ and the fuel injection ratio on the compression stroke side with which the exhaust is minimized when the wall surface temperature is $X_2$ is $B_2$.

With conventional control based on the water temperature, the fuel injection ratio is changed at a time $T_4$, and it is difficult to set the fuel injection ratio to the ratio at which the exhaust is minimized between a time $T_2$ and the time $T_4$. On the other hand, a following delay time is shorter for the wall surface temperature used in the present embodiment than that for the water temperature. The internal combustion engine control device of the present embodiment can estimate the wall surface temperature every cycle by measuring an in-cylinder pressure every cycle. Then, it is possible to control the fuel injection ratio with the short following delay as illustrated in the time chart of FIG. 10(c). For example, as the ratio of fuel to be injected into the cylinder during the compression stroke is increased, the gas temperature decreases due to vaporization heat of the fuel, and the effect of suppressing knocking can be obtained. Then, it is possible to obtain the ignition timing at which the fuel consumption is optimized while minimizing the exhaust, and it is possible to reduce the exhaust and fuel consumption.

Although the case where the vehicle decelerates has been described as an example in the present embodiment, it is possible to control the fuel injection ratio with the short following delay by estimating the wall surface temperature following an increasing amount of heat generated in an engine in the same manner even during acceleration.

Figure 11:
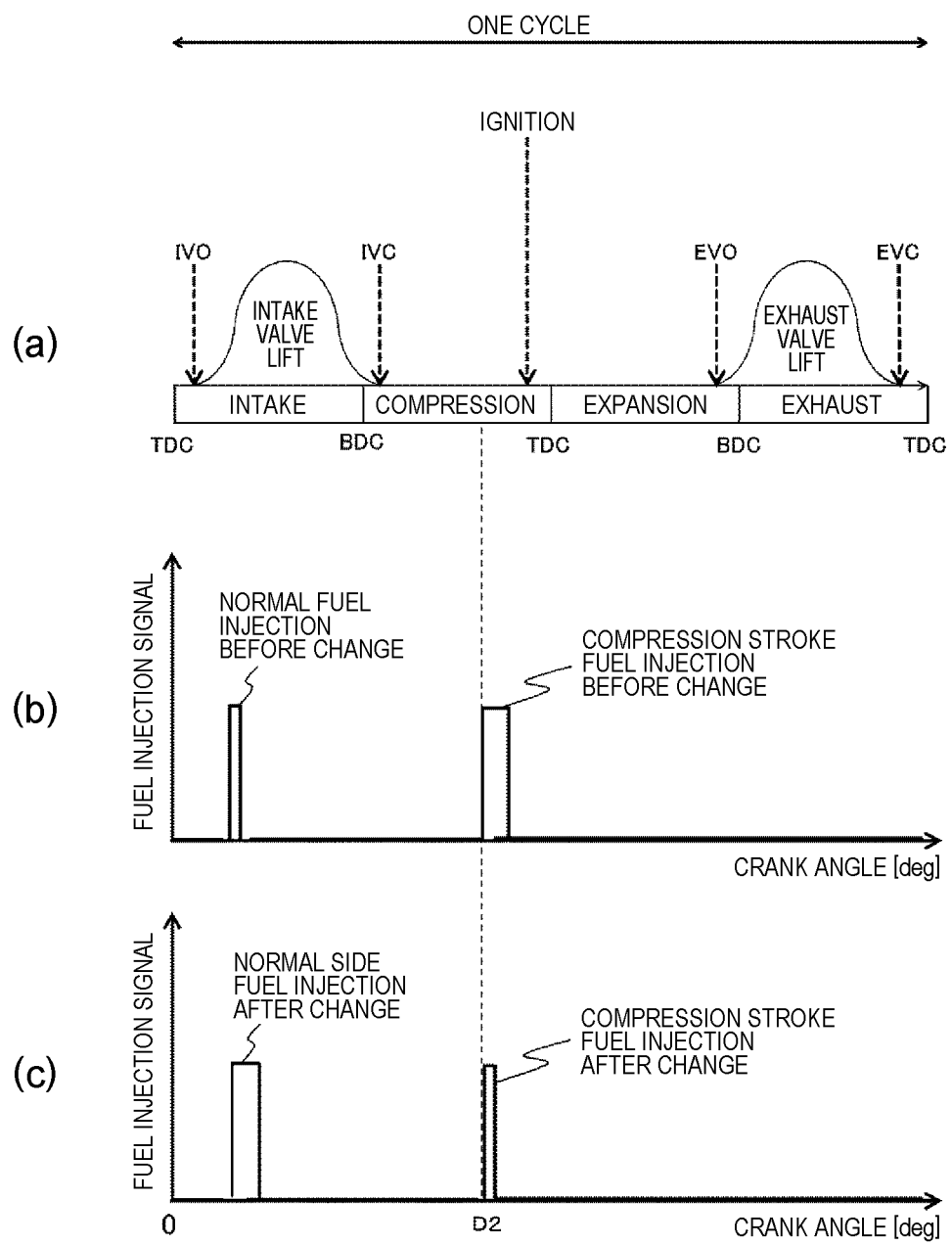
FIG. 11 is a time chart illustrating an example of operations of intake and exhaust valves during one cycle and a ratio of fuel in a split injection in the internal combustion engine control device according to the third embodiment.

FIG. 11 is a time chart illustrating an example of operations of intake and exhaust valves during one cycle and the ratio of fuel in the split injection in the internal combustion engine control device according to the third embodiment. FIG. 11(a) illustrates lifts of the intake valve 21 and the exhaust valve 22. A fuel injection signal in FIGS. 11(b) and 11(c) illustrates a fuel injection pattern according to the present embodiment, and indicates that fuel is injected when a value thereof is not zero. In addition, it is indicated that the fuel injection amount increases as a lateral width of the fuel injection signal becomes wider.

When the ratio of fuel to be injected during the compression stroke is increased, the gas temperature decreases due to the vaporization heat of the fuel, and the effect of suppressing knocking can be obtained. However, when the fuel injection ratio in a compression process is excessively increased, the mixed state of fuel and air deteriorates, the locally lean or rich region is formed in the air-fuel mixture, and the combustion stability deteriorates. Then, it is difficult to select the ignition timing that optimizes the fuel consumption while minimizing the exhaust so that the exhaust and fuel consumption deteriorate.

FIG. 11(b) illustrates the fuel injection timing before changing the ratio when two fuel injections of split injections are performed in the intake stroke and the compression stroke, respectively. It is assumed that the mixed state of fuel and air deteriorates and the combustion stability deteriorates since the ratio of fuel to be injected on the compression stroke side is high. Therefore, the ratio of fuel for the two fuel injections is changed as illustrated in FIG. 11(c).

Specifically, the ratio of fuel in the fuel injection during the compression stroke is decreased. As a result, the combustion stability is improved, it becomes possible to select the ignition timing that optimizes the fuel consumption while minimizing the exhaust, and it is possible to reduce the exhaust and fuel consumption.

As the wall surface temperature is estimated following the varying amount of heat generated in the engine and the ratio of fuel to be injected in each fuel injection in the split injection is changed based on the estimation result of the wall surface temperature in this manner, it is possible to adjust the amount of injected fuel adhering to the wall surface and a cooling amount of the air-fuel mixture, and it is possible to suppress the exhaust and fuel consumption to be small in accordance with the wall surface temperature changing every moment during a transient operation.

Fourth Embodiment

In a fourth embodiment, an embodiment of a configuration and an operation of an internal combustion engine control device in a case where a control unit of the ECU 20 controls an ignition timing as a combustion parameter will be described with reference to FIGS. 12 and 13. A description regarding the same configuration as that of the first embodiment will be omitted.

Figure 12:
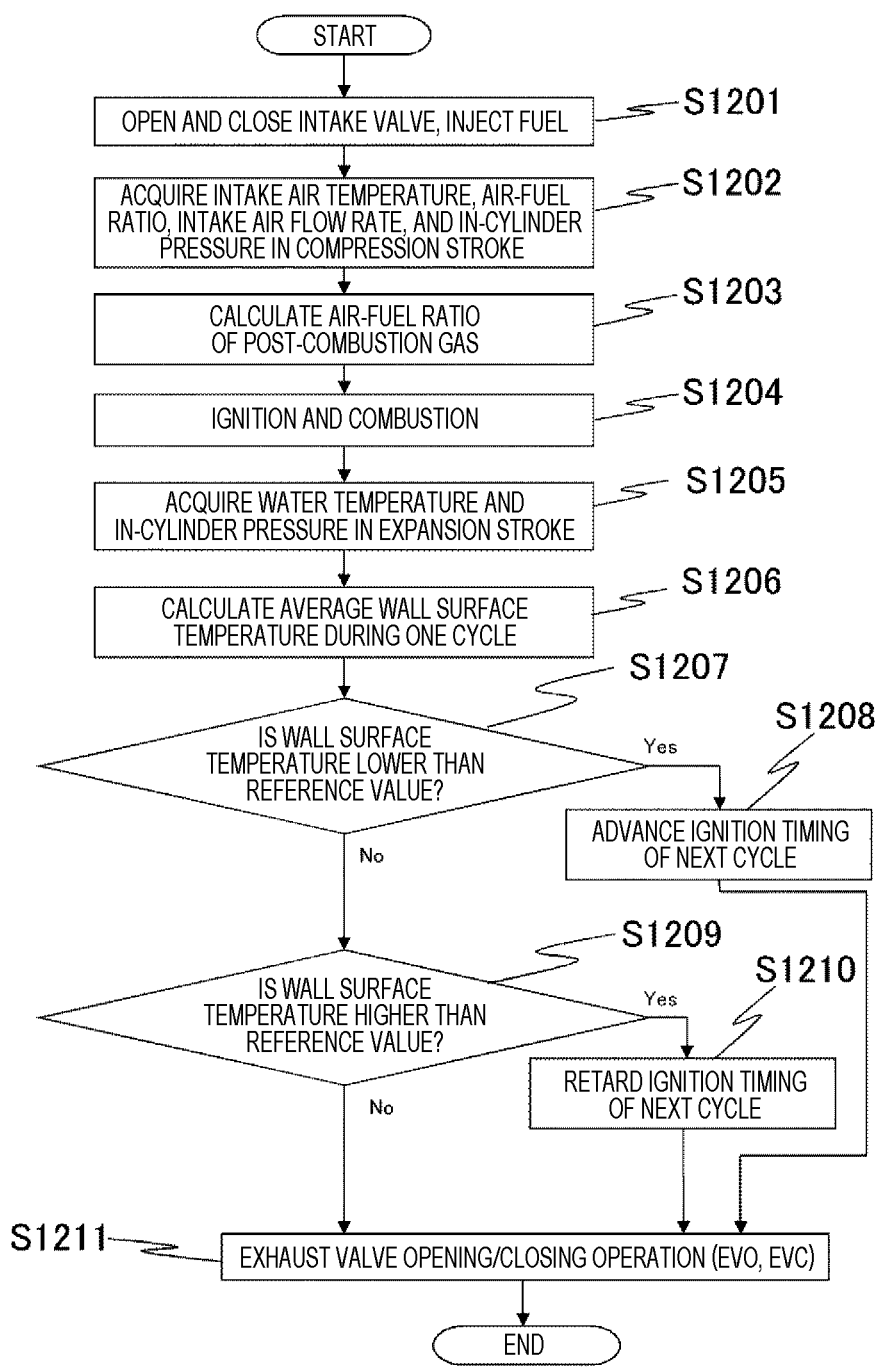
FIG. 12 is a flowchart illustrating an example of a process of correcting and controlling an ignition timing during one cycle according to a fourth embodiment.

FIG. 12 is a flowchart illustrating an example of a process of correcting and controlling an ignition timing during one cycle according to the fourth embodiment. An ignition coil (not illustrated), configured to supply a high voltage to the ignition plug 17 that performs ignition, is attached to an internal combustion engine (engine 100). The control unit of the ECU 20 corrects a rise timing of a secondary-side coil current of the ignition coil in a combustion cycle based on a gas temperature and an EGR rate. Steps S1201 to S1207 are the same as steps S401 to S407 in FIG. 4, and thus, detailed descriptions thereof will be omitted.

In the present embodiment, when a wall surface temperature is lower than a reference value, the control unit advances the ignition timing of the next cycle in step S1208. When the ignition timing is advanced, a period during which a combustion gas is compressed by a piston becomes long and a maximum temperature of the combustion gas rises. As a result, a heat transfer amount to a wall surface of the cylinder 15 increases, and the wall surface temperature rises. As the wall surface temperature rises, it is possible to suppress fuel injected in the next cycle from adhering to the wall surface, and the exhaust is reduced.

In addition, the control unit compares the wall surface temperature with the reference value in step S1209, and retards the ignition timing of the next cycle in step S1210 when the wall surface temperature is higher than the reference value. If the ignition timing is excessively advanced, a temperature and a pressure of the combustion gas rise. Accordingly, preignition in which an air-fuel mixture self-ignites before being ignited by the ignition plug 17 or abnormal combustion such as knocking is caused, and as a result, exhaust or fuel consumption deteriorates.

The ignition timing is retarded when the wall surface temperature is higher than the reference value, and thus it is possible to lower the gas temperature in the cylinder, to suppress the abnormal combustion, and to improve the exhaust and fuel consumption. A target value of the ignition timing may be obtained by numerical analysis or an experiment of a discharge amount of exhaust components depending on the ignition timing for each wall surface temperature so as to obtain the ignition timing at which the exhaust is minimized. Alternatively, a relationship between the wall surface temperature and the ignition timing may be mapped in advance in advance. Thereafter, in step S1211, an exhaust valve is opened so that a post-combustion gas is exhausted, the exhaust valve is closed, and one cycle is completed.

Incidentally, if the EGR rate almost exceeds 30%, the combustion stability deteriorates so that it is difficult to obtain stable combustion even if the ignition timing is advanced. Therefore, when the EGR rate becomes equal to or higher than a set value (for example, 30%), it is preferable to set the reference value of the wall surface temperature so as not to advance the ignition timing regardless of the wall surface temperature.

In EGR, an exhaust gas is taken out to the EGR pipe 40 from the downstream side of the three-way catalyst 10 in the exhaust pipe in FIG. 1, is cooled to a predetermined temperature by the EGR cooler 42, and then, is refluxed to the upstream side of the compressor 4a on the intake pipe 6. The EGR according to the above method will be referred to as external EGR to be distinguished from internal EGR to be described later.

The amount of the exhaust gas recirculated by the external EGR is controlled to be constant by the EGR valve 41. Here, since a composition of the exhaust gas varies depending on an air-fuel ratio of a pre-combustion cycle or a variation of an intake air amount, the EGR rate varies every combustion cycle.

When the EGR rate increases even if the wall surface temperature is the same, knocking is suppressed, a limit for advancing the ignition timing expands, and an optimum ignition timing also moves to the advancement side. Conversely, when the EGR rate decreases, the effect of suppressing knocking decreases and the advancement limit of the ignition timing shrinks. In addition, the optimum ignition timing moves to the retardation side. In the internal combustion engine control device according to the present embodiment, an ignition timing target value is advanced by a correction of increasing the reference value to be compared with the wall surface temperature, for example, when the EGR rate increases. In addition, when the EGR rate decreases, the ignition timing target value is retarded by a correction of decreasing the reference value of the wall surface temperature.

Figure 13:
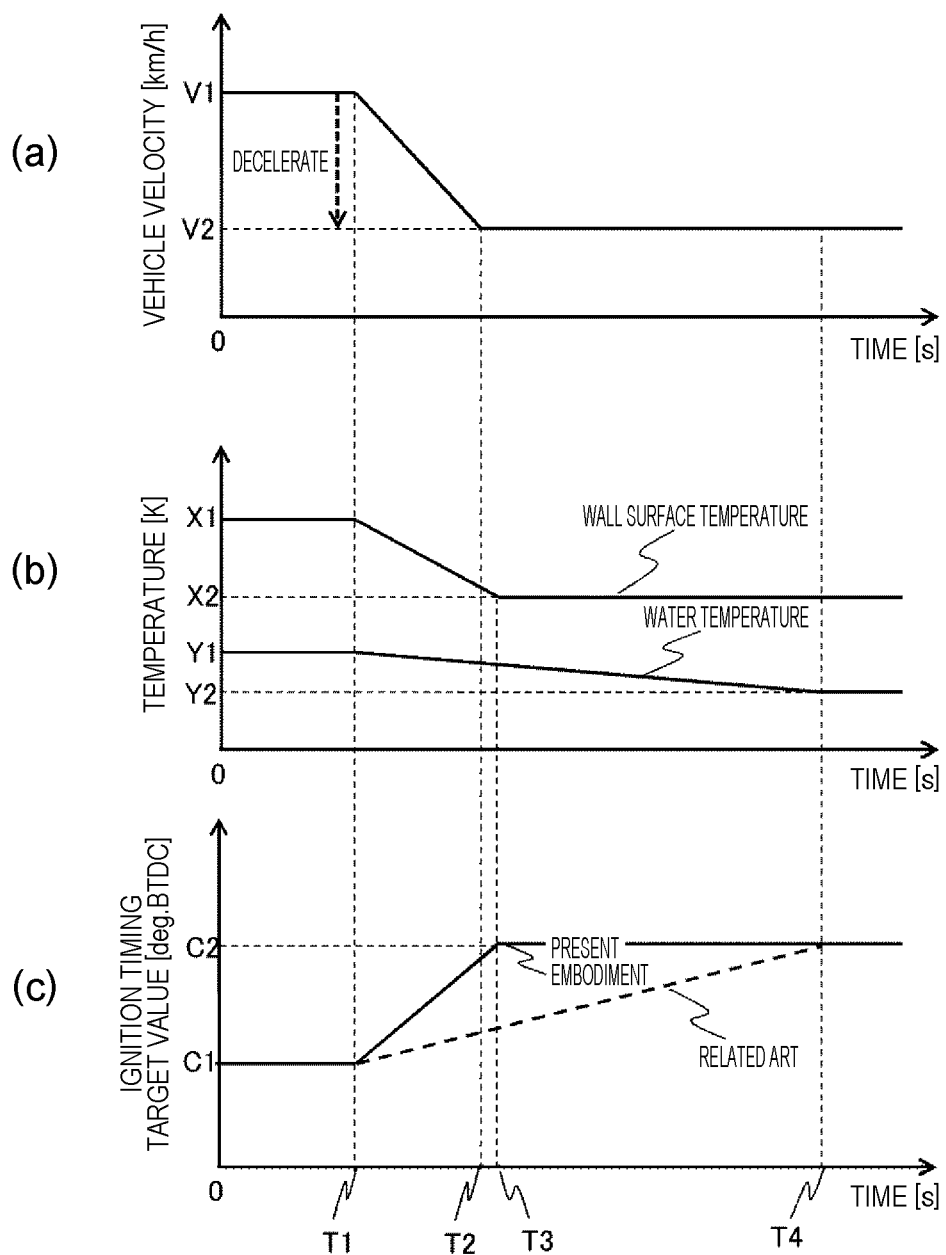
FIG. 13 is a time chart illustrating temporal changes of a vehicle velocity, a wall surface temperature, a water temperature, and an ignition timing target value in an internal combustion engine control device according to the fourth embodiment.

FIG. 13 is a time chart illustrating temporal changes of a vehicle velocity, the wall surface temperature, a water temperature, and the ignition timing target value in the internal combustion engine control device according to the fourth embodiment. In the present embodiment, a description will be given by exemplifying control when the vehicle velocity decreases from a velocity $V_1$ to $V_2$. The temporal changes of the vehicle velocity, the wall surface temperature, and the water temperature are the same as those in FIG. 5, and thus, detailed descriptions thereof will be omitted. It is assumed that the ignition timing at which exhaust is minimized when the wall surface temperature is $X_1$ is $C_1$ and the ignition timing at which the exhaust is minimized when the wall surface temperature is $X_2$ is $C_2$.

FIG. 13(c) indicates the ignition timing target value stored by the ECU, and the control unit rewrites the ignition timing target value based on a correction value at the time $T_3$. In conventional control based on the water temperature, the ignition timing is changed at a time $T_4$, and it is difficult to obtain the ignition timing at which the exhaust is minimized between a time $T_2$ and the time $T_4$. On the other hand, a following delay time is shorter for the wall surface temperature than that for the water temperature.

In this manner, the wall surface temperature is estimated every cycle by measuring an in-cylinder pressure every cycle in the internal combustion engine control device of the present embodiment, and it is possible to control the ignition timing, synchronized with the wall surface temperature, with the short following delay as illustrated in the time chart of FIG. 13(c). As a result, it is possible to select the ignition timing that optimizes the fuel consumption while minimizing the exhaust, and it is possible to reduce the exhaust and fuel consumption.

Fifth Embodiment

A fifth embodiment illustrates an example in which a specific heat ratio of a post-combustion gas is calculated and a wall surface temperature is calculated using the specific heat ratio. A process of calculating the specific heat ratio of the post-combustion gas and a process of calculating the wall surface temperature in the fifth embodiment will be described with reference to FIGS. 14 to 16. In addition, the present embodiment illustrates an example of controlling a fuel injection timing as in the first embodiment illustrated in FIG. 4.

Figure 14:
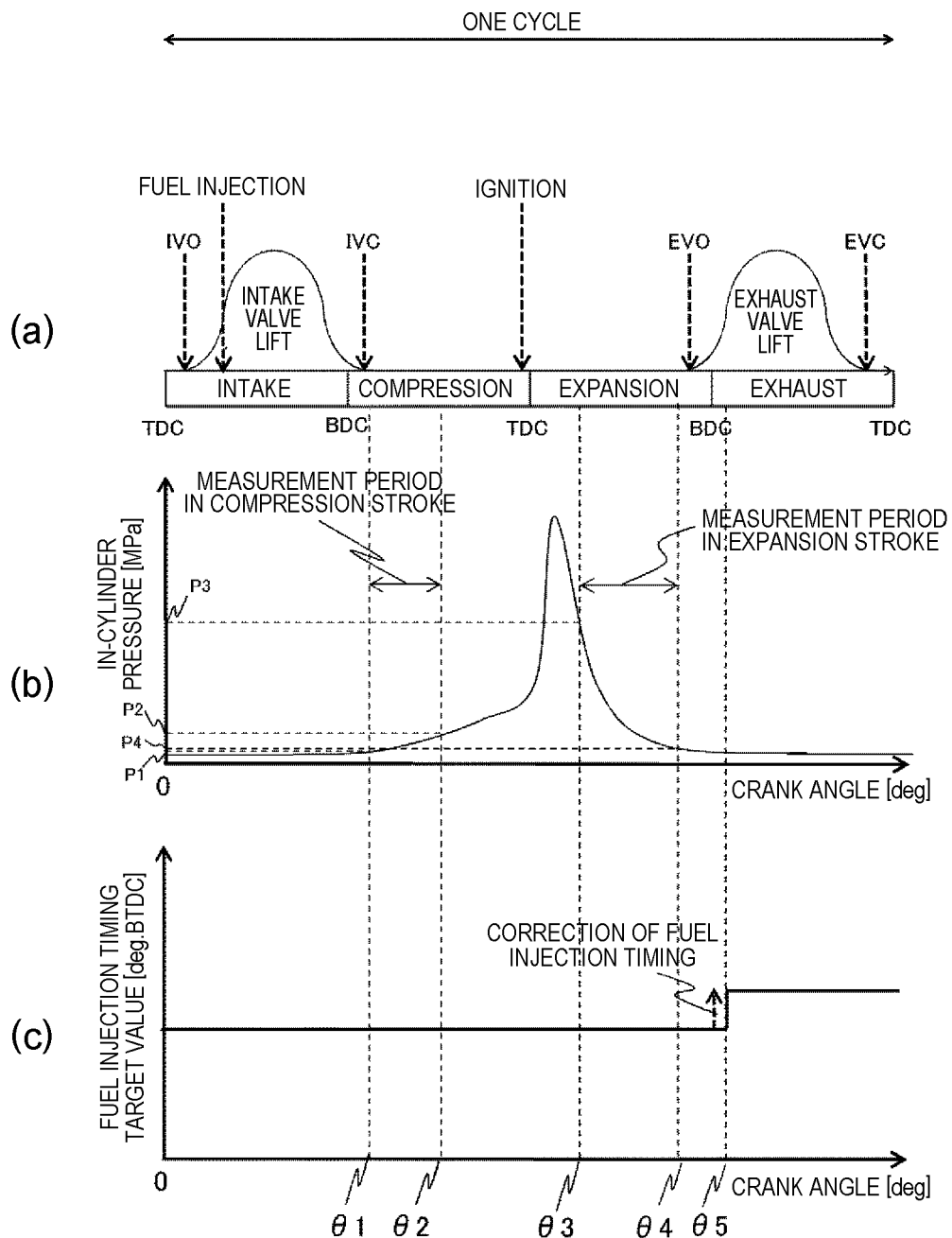
FIG. 14 is a time chart illustrating change of an in-cylinder pressure and a fuel injection timing target value with respect to a crank angle during one cycle in an internal combustion engine control device according to a fifth embodiment.

FIG. 14 is a time chart illustrating change of an in-cylinder pressure and a fuel injection timing target value with respect to a crank angle during one cycle in an internal combustion engine control device according to the fifth embodiment.

FIG. 14(a) illustrates lifts of the intake valve 21 and the exhaust valve 22. The intake valve 21 is closed at a crank angle $\theta_1$, and an intake stroke is completed. At the crank angle $\theta_1$, an in-cylinder pressure $P_1$ is measured. When a compression stroke starts subsequently to the intake stroke, the in-cylinder pressure starts to rise from $P_1$ at the crank angle $\theta_1$ as illustrated in FIG. 14 (b). An in-cylinder pressure $P_2$ is measured at a crank angle $\theta_2$ where the compression stroke has been progressed. Here, it is possible to calculate a pressure change $(P_2-P_1)$ at two points. In addition, it is possible to obtain in-cylinder volumes $V_1$ and $V_2$ based on crank angle detection values $\theta_1$ and $\theta_2$. It is possible to estimate a gas temperature and an EGR rate based on at least one or more values of these measurement values, an air-fuel ratio, and an intake air mass.

In step S403, the control unit obtains the specific heat ratio of the post-combustion gas. A method of calculating the specific heat ratio of the post-combustion gas will be described later.

Next, an expansion stroke starts when the in-cylinder pressure exceeds a peak, and the in-cylinder pressure starts to decrease from $P_3$ at a crank angle $\theta_3$ as illustrated in FIG. 14(b). An in-cylinder pressure $P_4$ at the crank angle $\theta_3$ is measured. In addition, the in-cylinder pressure $P_4$ is measured at a crank angle $\theta_4$ where the expansion stroke has been progressed. As a result, it is possible to obtain a pressure change $(P_4-P_3)$ at two points. In addition, it is possible to obtain in-cylinder volumes $V_3$ and $V_4$ based on crank angle detection values $\theta_3$ and $\theta_4$.

The control unit estimates the wall surface temperature based on at least one or more values of these measurement values, the specific heat ratio of the post-combustion gas, and a water temperature in step S406. A method of estimating the wall surface temperature will be described later.

The control unit compares the estimated wall surface temperature with a reference value in step S407, and changes the fuel injection timing in step S408 at a crank angle $\theta_5$ as illustrated in FIG. 14(c). The control unit compares the estimated wall surface temperature with the reference value in step S409, and changes the fuel injection timing in step S410 at the crank angle $\theta_5$ as illustrated in FIG. 14(c).

Next, the method of estimating the specific heat ratio of the post-combustion gas in step S403 will be described with reference to FIG. 15.

Figure 15:
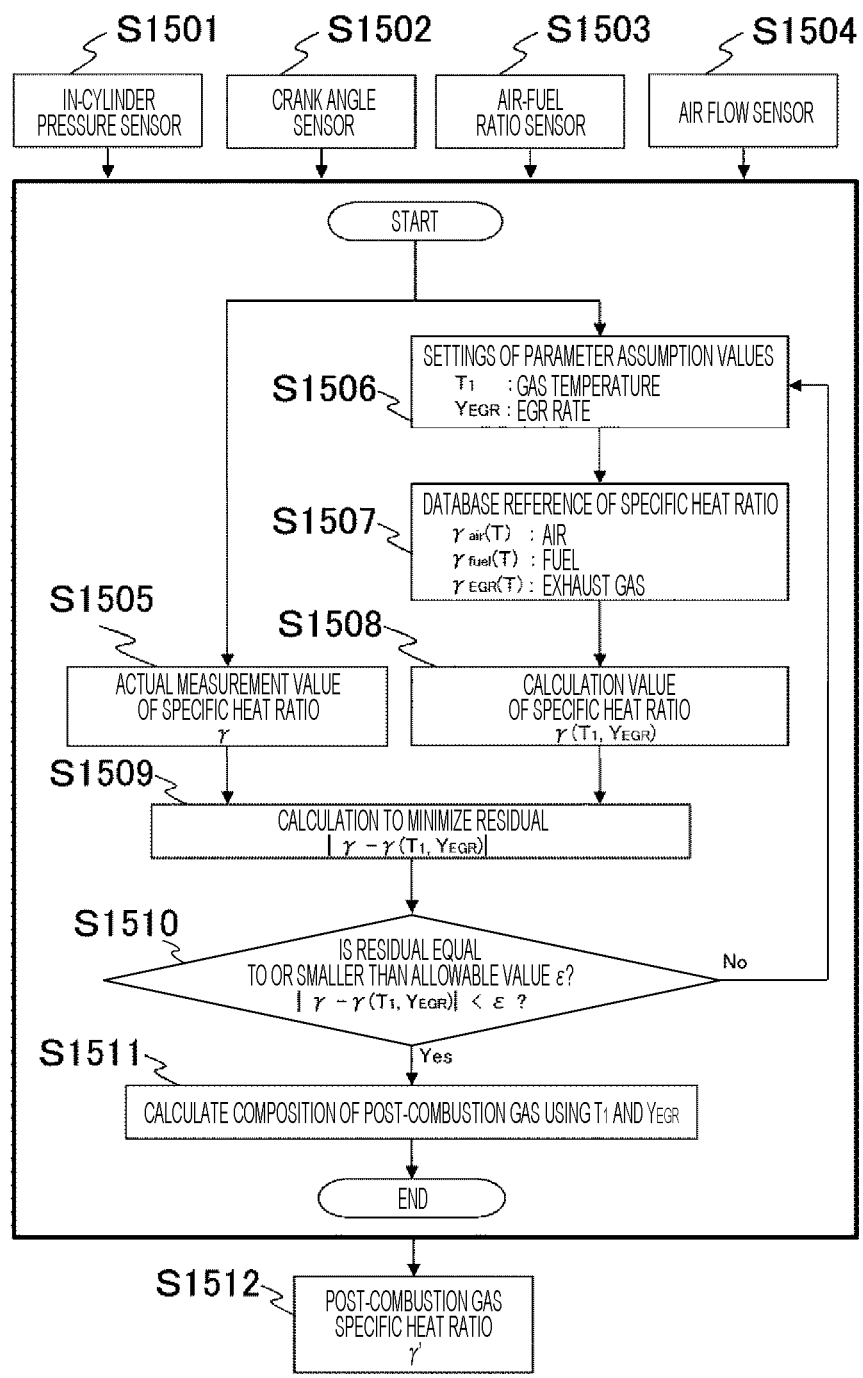
FIG. 15 is a flowchart illustrating a process of calculating a specific heat ratio of a post-combustion gas in the internal combustion engine control device according to the fifth embodiment.

FIG. 15 is a flowchart illustrating a process of calculating the specific heat ratio of the post-combustion gas in the internal combustion engine control device according to the fifth embodiment.

First, the control unit acquires various state quantities in the cylinder by various sensors. In step S1501, the control unit acquires an in-cylinder pressure P from a value measured by an in-cylinder pressure sensor. In step S1502, the control unit acquires a current crank angle $\theta$ from a crank angle sensor, and acquires an in-cylinder volume V set depending on the crank angle $\theta$ and shape information of the cylinder 15. In step S1503, the control unit acquires an air-fuel ratio $C_{AF}$ by an air-fuel ratio sensor attached to an exhaust pipe. In step S1504, the control unit acquires a mass m of intake air by an intake air flow sensor.

Next, the control unit calculates an actual measurement value of the specific heat ratio assuming that a compression stroke is adiabatic compression in step S1505. In-cylinder pressures $P_1$ and $P_2$ and in-cylinder volumes $V_1$ and $V_2$ are acquired between a compression start crank angle $\theta_1$ to a crank angle $\theta_2$ in the middle of the stroke, and an actual measurement value $\gamma_1$ of the specific heat ratio of a mixed gas is calculated using the following Formula (1).

[Expression 1]

$$\gamma_1 = -\frac{\ln(P_2) - \ln(P_1)}{\ln(V_2) - \ln(V_1)} \quad (1)$$

Next, the control unit calculates a calculation value of the specific heat ratio using a gas state equation with a gas temperature during IVC and an EGR rate as parameters of a road in step S1506 to step S1508.

In step S1506, the control unit sets a gas temperature $T_1$ during IVC and an EGR rate $Y_{EGR}$ of the gas to temporary values. In step S1507, the control unit acquires a specific heat ratio $\gamma_{Air}(T)$ of air, vaporized fuel $\gamma_{fuel}(T)$ a specific heat ratio $\gamma_{EGR}(T)$ of an exhaust gas when combusted with a stoichiometric air-fuel ratio as temperature-dependent data.

In step S1508, a specific heat ratio $\gamma_2$ of the mixed gas in which air, fuel, and the exhaust gas are mixed can be expressed by the following Formula (2) using the air-fuel ratio $C_{AF}$ acquired in step S1503.

[Expression 2]

$$\gamma_2 = \frac{C_{AF}(1-Y_{EGR})}{C_{AF}+1}\gamma_{Air}(T_1) + \gamma_{EGR}(T_1)Y_{EGR} + \gamma_{Fuel}(T_1)\frac{1-Y_{EGR}}{C_{AF}+1} \quad (2)$$

Here, $C_{AF}(1-Y_{EGR})(C_{AF}+1)$ represents a mass ratio of air in the mixed gas, and $(1-Y_{EGR})(C_{AF}+1)$ represents a mass ratio of fuel in the mixed gas.

Next, the state equation of the in-cylinder gas during IVC is expressed by Formula (3) by additionally using the intake air mass m acquired in step S1504.

[Expression 3]

$$P_1 V_1 = \frac{m}{1 - \frac{1-Y_{EGR}}{C_{AF}+1} - \frac{C_{AF}+1}{(A/F)_{st}+1}Y_{EGR}} \left(\frac{C_{AF}(1-Y_{EGR})}{(1+C_{AF})W_{Air}} + \frac{1-Y_{EGR}}{(1+C_{AF})W_{Fuel}} + \frac{Y_{EGR}}{W_{EGR}}\right)R_u T_1 \quad (3)$$

Here, a mass $M_1$ of the in-cylinder gas is represented by Formula (31), and a general gas constant Ru is illustrated in Formula (32).

[Expression 4]

$$M_1 = \frac{M_{Air,fresh}}{1 - \frac{1-Y_{EGR}}{C_{AF}+1} - \frac{C_{AF}+1}{(A/F)_{st}+1}Y_{EGR}} \quad (31)$$

[Expression 5]

$$R_1 = \left(\frac{C_{AF}(1-Y_{EGR})}{(1+C_{AF})W_{Air}} + \frac{1-Y_{EGR}}{(1+C_{AF})W_{Fuel}} + \frac{Y_{EGR}}{W_{EGR}}\right)R_u \quad (32)$$

In Formulas (2) and (3), unknown parameters are only the gas temperature $T_1$ during IVC and the EGR rate $Y_{EGR}$ of the gas, and it is possible to obtain the unknown parameters by solving simultaneous equations using two formulas.

However, each of the two formulas includes a nonlinear term, and thus, it is difficult to directly solve the formulas. Therefore, a residual between the actual measurement value $\gamma_1$ of the specific heat ratio obtained by Formula (1) and the calculation value $Y_2$ of the specific heat ratio set by Formulas (2) and (3) is calculated in step S1509, and a convergence calculation is performed to minimize the residual and the unknown parameters $T_1$ and $Y_{EGR}$ are identified in step S1510.

In the convergence calculation, possible ranges of the gas temperature $T_1$ and the EGR rate $Y_{EGR}$ are defined in advance in order to suppress an increase of a calculation load due to searching, and then, parallel calculation is performed assuming a plurality of values within the range, for example, thirty values for each. From an identification result, the gas temperature $T_1$ is obtained in step S1511, and the EGR rate $Y_{EGR}$ is obtained in step S1512.

As the temperature $T_1$ during IVC that is used to be unknown is set, it is possible to calculate a gas temperature at an arbitrary point during compression including a temperature at a compression top dead center using the following Formula (4).

[Expression 6]

$$T_1 V_1^{\gamma-1} = T_2 V_2^{\gamma-1} \quad (4)$$

In the internal combustion engine control device according to the present embodiment, the specific heat ratio is identified based on history of the change in the in-cylinder pressure in the compression stroke. Here, a qualitative tendency of the parameter to be identified is described.

When the gas temperature is high, the specific heat ratio of air, fuel, and the exhaust gas decreases as the temperature rises, and the rise of the in-cylinder pressure becomes gentle. Similarly, even when the EGR rate is high, the specific heat ratio is about 1.25 and the ratio of exhaust gas which is small even as compared with a specific heat ratio of room-temperature air of about 1.40 increases, and thus, the specific heat ratio of the gas decreases and the rise of the in-cylinder pressure becomes gentle. Conversely, when the gas temperature is low or when the EGR rate is high, the rise of the in-cylinder pressure becomes steep. The gas temperature and EGR rate are identified based on these features of the in-cylinder pressure change.

As described above, the control unit of the ECU 20 identifies the specific heat ratio of the gas based on the in-cylinder pressure of the gas inside the cylinder and the in-cylinder volume in a state where both the intake valve 21 and the exhaust valve 22 are closed, and identifies the as temperature and the EGR rate which minimize the residual of the specific heat ratio of the air-fuel mixture calculated assuming the gas temperature and the EGR rate and satisfy the state equation of the air-fuel mixture, thereby obtaining the gas temperature and the EGR rate. Since the gas temperature and the EGR rate are identified by the convergence calculation of the actual measurement value of the specific heat ratio and the calculation value in this manner, it is possible to estimate the temperature of the in-cylinder gas during IVC that is hardly measured by a conventional intake air temperature sensor.

Here, the air-fuel ratio acquired in step S1503 and the intake air mass acquired in step S1504 are also generally measured on the upstream side of the intake pipe 6, values thereof vary for each cylinder and for each combustion cycle. Thus, even the air-fuel ratio $C_{AF}$ and the intake air mass m may be identified as unknown parameters by giving assumption values and setting a search range using sensor values as reference values.

Incidentally, the specific heat ratios $\gamma_{Air}(T)$ $\gamma_{fuel}(T)$, and $\gamma_{EGR}(T)$, which change nonlinearly with respect to the temperature, may be approximated by straight lines for each section to set a linear equation for the assumed temperature so that it is possible to analytically solve Formulas (3) and (4) as simultaneous equations and the convergence calculation is unnecessary.

Next, a method of estimating the wall surface temperature in step S406 will be described with reference to FIG. 16.

Figure 16:
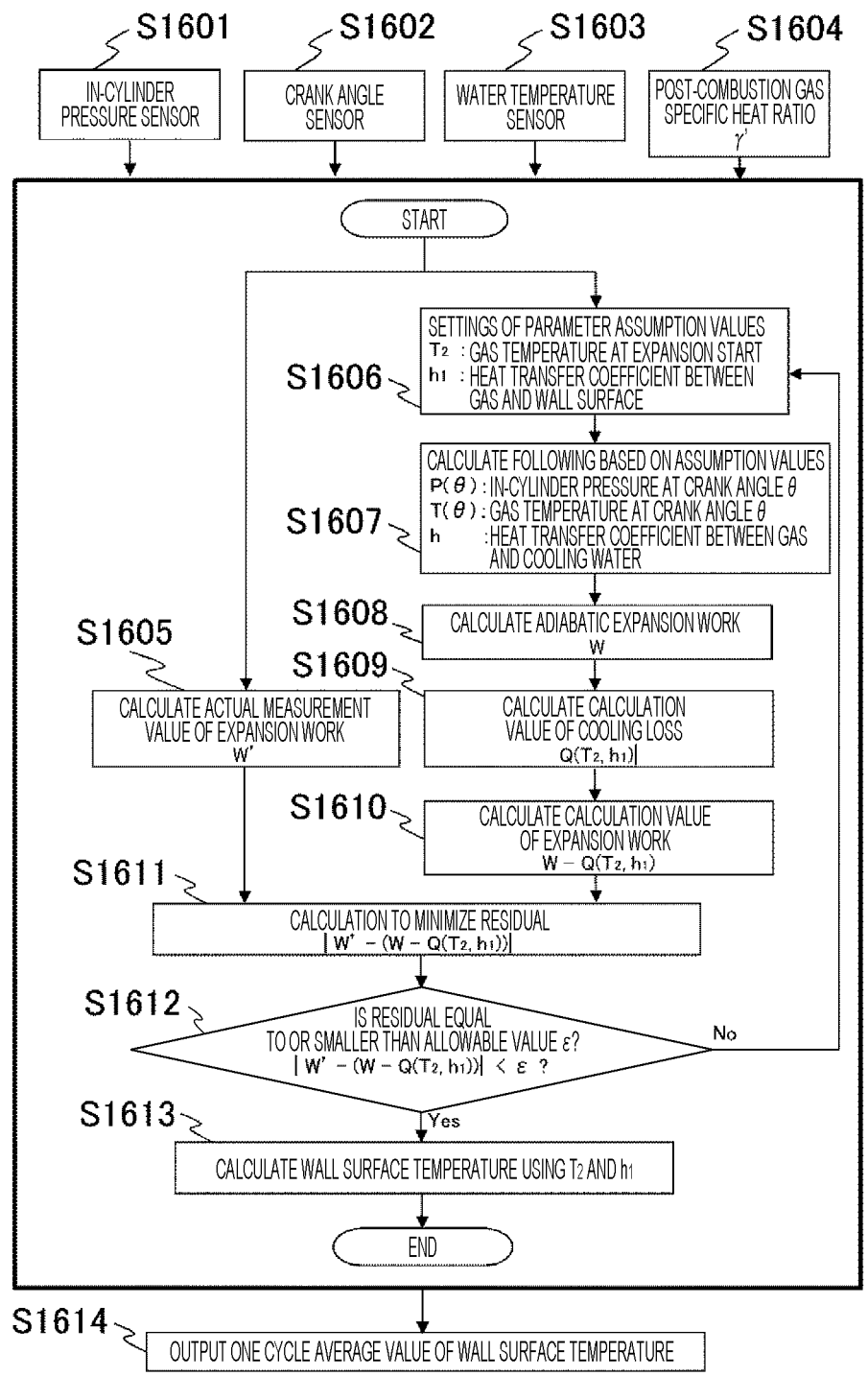
FIG. 16 is a flowchart illustrating a process of calculating a wall surface temperature in the internal combustion engine control device according to the fifth embodiment.

FIG. 16 is a flowchart illustrating a process of calculating the wall surface temperature in the internal combustion engine control device according to the fifth embodiment.

First, the control unit acquires state quantities in the cylinder by various sensors. In step S1601, the control unit acquires the in-cylinder pressure P from the in-cylinder pressure sensor. In step S1602, the control unit acquires the current crank angle θ from the crank angle sensor, and acquires the in-cylinder volume V set depending on the crank angle θ and the shape information of the cylinder. In step S1603, the control unit acquires a water temperature Tw from a water temperature sensor attached to a cooling water pipe. In step S1604, the control unit acquires a specific heat ratio γ' of the post-combustion gas estimated in step S1512.

Next, in step S1605, the control unit calculates an actual measurement value of expansion work from the in-cylinder pressure acquired in step S1601 and the in-cylinder volume based on the crank angle acquired in step S1602. In-cylinder pressures $P_3$ and $P_4$ and in-cylinder volumes $V_3$ and $V_4$ are acquired between an expansion start crank angle $\theta_3$ to a crank angle $\theta_4$ in the middle of the stroke, and the actual measurement value of the expansion work of the mixed gas is calculated using the following Formula (5).

[Expression 7]

$$W' = \int_{V_3}^{V_4} P' dV \quad (5)$$

Next, in step S1606, the control unit assumes a gas temperature $T_2$ at the start of expansion and a heat transfer coefficient $h_1$ between the gas and the wall surface as unknown parameters. In step S1607, the control unit uses the assumed unknown parameters to calculate an in-cylinder pressure P(θ) at a certain crank angle θ, a post-combustion gas temperature $T_2$ at the certain crank angle θ, and a heat transfer coefficient h between the gas and the wall surface using the following Formulas (6), (7), and (8).

[Expression 8]

$$P(\theta) = P\left(\frac{V_3}{V(\theta)}\right)^{\gamma'} \quad (6)$$

$$T(\theta) = T_3\left(\frac{V_3}{V(\theta)}\right)^{\gamma'} \quad (7)$$

$$h = \frac{h_1 h_2}{h_1 + h_2} \quad (8)$$

Here, $h_2$ is an average heat transfer coefficient between the wall surface and the cooling water. Since $h_2$ is set depending on a shape of an engine and a flow rate of the cooling water and is not easily affected by a change in the combustion gas temperature, a value set by an experiment or numerical analysis in advance is used.

In step S1608, the control unit calculates ideal expansion work W assuming an adiabatic change using Formulas (6) and (7), by Formula (9).

[Expression 9]

$$W = \int_{\theta_3}^{\theta_4} P(\theta) V(\theta) d\theta \quad (9)$$

There is no consideration on the amount of heat escaping to the wall surface, that is, a cooling loss in the ideal expansion work calculated in step S1608. Since the gas temperature becomes higher in the expansion stroke than in the compression stroke, a temperature difference from the cooling water becomes large so that the cooling loss increases. Therefore, the control unit defines a cooling loss Q expressed by Formula (10) in step S1609. Formula (10) includes the gas temperature $T_2$ at the start of expansion and the heat transfer coefficient $h_1$ between the gas and the wall surface which are the unknown parameters assumed in step S1606. In addition, $A(\theta)$ is the area of an inner wall of the cylinder that contacts the post-combustion gas, which varies depending on the crank angle $\theta$.

[Expression 10]

$$Q = h\int_{\theta_3}^{\theta_4} A(\theta)(T(\theta) - T_w) d\theta \tag{10}$$

In step S1610, the control unit calculates a calculation value of the expansion work by subtracting the cooling loss Q calculated in step S1609 from the ideal expansion work W calculated in step S1608 by Formula (11).

[Expression 11]

$$\int_{\theta_3}^{\theta_4} P(\theta) V(\theta) d\theta - h\int_{\theta_3}^{\theta_4} A(\theta)(T(\theta) - T_w) d\theta \tag{11}$$

In Formula (11), the unknown parameters are only the gas temperature $T_2$ at the start of expansion and the heat transfer coefficient $h_1$ between the gas and the wall surface. The unknown parameters can be obtained by solving a formula assuming that Formulas (5) and (11) are equal. However, each of the two Formulas (9) and (10) includes a nonlinear term, it is difficult to solve directly the formulas.

Therefore, in step S1611, the control unit performs a convergence calculation to minimize a residual between the actual measurement value of the expansion work obtained in step S1605 and the calculation value of the expansion work calculated in step S1610 to identify the unknown parameters $T_2$ and $h_1$. In the convergence calculation, possible ranges of the gas temperature $T_2$ at the start of expansion and the heat transfer coefficient $h_1$ between the gas and the wall surface are defined in advance in order to suppress an increase of a calculation load due to searching, and then, parallel calculation is performed assuming a plurality of values within the range, for example, thirty values for each. In step S1612, when the residual calculated in step S1611 becomes equal to or less than an allowable value s, the control unit outputs values of $T_2$ and $h_1$ as identification results.

In step S1613, the control unit calculates a wall surface temperature $T_{wall}(\theta)$ based on the identification results by Formula (12).

[Expression 12]

$$T_{wall}(\theta) = \frac{\dfrac{T_w}{A(\theta)h_1} + \dfrac{T(\theta)}{A(\theta)h_2}}{\dfrac{1}{A(\theta)h_1} + \dfrac{1}{A(\theta)h_2}} \tag{12}$$

In step S1614, the control unit calculates and outputs a one-cycle average value of the wall surface temperature $T_{wall}(\theta)$.

In the internal combustion engine control device according to the present embodiment, the wall surface temperature is identified based on history of the change in the in-cylinder pressure in the expansion stroke. Here, a qualitative tendency of the parameter to be identified is described.

When the wall surface temperature is low, the amount of heat lost due to the cooling loss increases, and thus, a drop of the in-cylinder pressure become steep. Conversely, when the wall surface temperature is high, the drop of the in-cylinder pressure becomes gentle. The wall surface temperature is identified based on these features of the in-cylinder pressure change.

As described above, the control unit of the ECU 20 estimates the specific heat ratio of the post-combustion gas based on the pressure of the gas in the cylinder and the in-cylinder volume in the state where both the intake valve 21 and the exhaust valve 22 are closed. Further, the control unit identifies the gas temperature at the start of expansion and the heat transfer coefficient between the gas and the wall surface, which minimize the residual between the calculation value of the expansion work of the combustion gas calculated by assuming the gas temperature at the start of expansion and the heat transfer coefficient between the gas and the wall surface and the actual measurement value, and calculates an estimation value of the wall surface temperature using these values.

Since the wall surface temperature is estimated by the convergence calculation of the actual measurement value and the calculation value of the expansion work in this manner, it is possible to estimate the wall surface temperature every cycle which is hardly measured by a conventional water temperature sensor, and it becomes possible to reduce the exhaust in a transient operation. In the process of calculating the wall surface temperature in the internal combustion engine control device according to the fifth embodiment, values of various sensors including the in-cylinder pressure sensor, the crank angle sensor, the water temperature sensor, the air-fuel ratio sensor, and the air flow sensor are used. Thus, abnormal combustion such as knocking gives noise to the sensor to increase an error of the estimation value of the wall surface temperature in some cases. Therefore, feedback of the estimation result may be canceled when the abnormal combustion such as knocking occurs. That is, the control unit monitors whether or not abnormal combustion has occurred, and stops the correction of the fuel injection timing in the control of the fuel injection timing based on the estimation value of the wall surface temperature when detecting the abnormal combustion.

At that time, the in-cylinder pressure sensor or a knock sensor detecting engine vibration may be used to detect the abnormal combustion. In addition, there is a case where an error occurs in an output value of the in-cylinder pressure sensor, the crank angle sensor, the air flow sensor, or the like so that an error of the estimation value of the wall surface temperature increases even when traveling on bad roads such as an uneven road surface and a frozen road surface. Therefore, when detecting the traveling on the bad road, the control unit may stop the feedback of the estimation result in the present embodiment. For example, any one or a plurality of an acceleration sensor mounted on a vehicle, a difference in the number of revolutions of two wheels, and an image or a video captured by an in-vehicle camera may be used to detect the bad road.

Since the control based on the wall surface temperature estimation result is stopped in accordance with a combustion state and a situation of the outside world, it is possible to suppress an adverse effect caused by deterioration in accuracy of the wall surface temperature estimation.

Incidentally, the present invention is not limited to the above-described embodiments and includes various modifications.

For example, the above-described embodiments have been described in detail in order to describe the present invention in an easily understandable manner, and are not necessarily limited to those including the entire configuration that has been described above. In addition, some configurations of a certain embodiment can be substituted by configurations of another embodiment, and further, a configuration of another embodiment can be also added to a configuration of a certain embodiment. Further, addition, deletion, or substitution of other configurations can be made with respect to some configurations of each embodiment.

The above-described embodiments of the present invention can be organized as follows.

Figure 17:
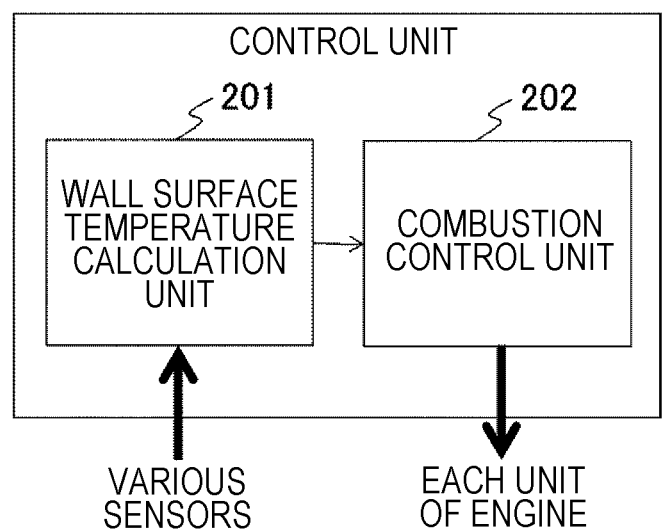
FIG. 17 is a block diagram illustrating a schematic functional configuration of a control unit according to various embodiments.

FIG. 17 is a block diagram illustrating a schematic functional configuration of the control unit according to the above-described embodiments. Referring to FIG. 17, the control unit includes a wall surface temperature calculation unit 201 and a combustion control unit 202.

(Aspect 1)

An internal combustion engine control device that controls an internal combustion engine, which injects fuel into a cylinder and generates combustion by ignition, includes: a wall surface temperature calculation unit that calculates a wall surface temperature of the cylinder based on a pressure in the cylinder; and a combustion control unit that controls the combustion of the internal combustion engine based on the calculated wall surface temperature. The wall surface temperature is calculated based on the pressure in the cylinder and the wall surface temperature is used for control of the internal combustion engine, and thus, it is possible to acquire the wall surface temperature in real time as compared with the case of obtaining the wall surface temperature from the cooling water temperature and to promptly perform the appropriate control.

(Aspect 2)

In the internal combustion engine control device of Aspect 1, the combustion control unit corrects a combustion parameter to be used for at least one of injection and ignition in the combustion based on the wall surface temperature. Since the combustion parameter can be promptly controlled to an appropriate value, it is possible to maintain favorable combustion and to reduce the amount of fuel adhering to the wall surface of the cylinder.

(Aspect 3)

In the internal combustion engine control device of Aspect 2, the combustion control unit measures the wall surface temperature every cycle and determines the combustion parameter in the next cycle based on the wall surface temperature. Since the combustion parameter can be controlled every cycle based on the latest wall surface temperature, it is possible to constantly maintain the combustion parameter at an appropriate value and to maintain the favorable combustion.

(Aspect 4)

In the internal combustion engine control device of Aspect 3, the combustion control unit changes a fuel injection timing of the next and subsequent cycles based on a result obtained by comparing the wall surface temperature with a predetermined reference value.

(Aspect 5)

In the internal combustion engine control device of Aspect 3, the internal combustion engine injects fuel by splitting the injection into a plurality of times within one cycle, and the combustion control unit changes the number of fuel injections in one cycle based on a result obtained by comparing the wall surface temperature with a predetermined reference value.

(Aspect 6)

In the internal combustion engine control device of Aspect 3, the internal combustion engine injects fuel by splitting the injection into a plurality of times within one cycle, and the combustion control unit changes a ratio of fuel to be injected in each fuel injection during one cycle in the next and subsequent cycles based on a result obtained by comparing the wall surface temperature with a predetermined reference value.

(Aspect 7)

In the internal combustion engine control device of Aspect 3, the combustion control unit changes an ignition timing of the next and subsequent cycles based on a result obtained by comparing the wall surface temperature with a predetermined reference value.

(Aspect 8)

In the internal combustion engine control device of Aspect 7, the combustion control unit advances the ignition timing to a fuel consumption optimum point when the wall surface temperature is lower than the reference value.

(Aspect 9)

In the internal combustion engine control device of Aspect 7, the combustion control unit retards the ignition timing to a predetermined time at which knocking does not occur when the wall surface temperature is higher than the reference value.

(Aspect 10)

In the internal combustion engine control device of Aspect 1, in an expansion stroke, the wall surface temperature calculation unit estimates first unknown parameters based on a difference between an actual measurement value of a workload calculated using results obtained by measuring in-cylinder pressures at a plurality of crank angles and a calculation value of a workload calculated based on a cooling loss and an assumption of adiabatic expansion including the first unknown parameters, and calculates a wall surface temperature for each cycle based on the estimated first unknown parameters. Since the wall surface temperature is calculated based on the cooling loss obtained from the difference between the actual measurement value of the workload and the calculation value, it is possible to promptly calculate the wall surface temperature.

(Aspect 11)

In the internal combustion engine control device of Aspect 10, the wall surface temperature calculation unit estimates the first unknown parameter by a calculation that minimizes the difference between the actual measurement value of the workload and the calculation value of the workload.

(Aspect 12)

In the internal combustion engine control device of Aspect 10, the first unknown parameters are a gas temperature at a start of expansion and a heat transfer coefficient between the gas and the wall surface.

(Aspect 13)

In the internal combustion engine control device of Aspect 10, the wall surface temperature calculation unit calculates the actual measurement value of the workload based on in-cylinder pressure measurement values measured at a plurality of crank angles and an in-cylinder volume set depending on a shape of a combustion chamber. Since the actual measurement value of the workload is calculated using the in-cylinder pressure measurement values at the plurality of crank angles, it is possible to obtain the actual measurement value of the workload with high accuracy.

(Aspect 14)

In the internal combustion engine control device of Aspect 11, the wall surface calculation unit calculates the calculation value of the workload based on a specific heat ratio of a post-combustion gas calculated based on a measured in-cylinder pressure, a crank angle, an air-fuel ratio, and a mass of intake air, an in-cylinder pressure calculated assuming adiabatic expansion, and an in-cylinder volume set depending on a shape of a combustion chamber. Since the calculation value of the workload is calculated based on the specific heat ratio of the post-combustion gas, it is possible to calculate the calculation value of the workload.

(Aspect 15)

In the internal combustion engine control device of Aspect 2, the combustion control unit stops correcting the combustion parameter based on the wall surface temperature in a predetermined abnormal state that affects the calculation of the wall surface temperature. When an error of the wall surface temperature becomes large due to the abnormal state, it is difficult to properly control the internal combustion engine, and thus, it is possible to stop the correction of the combustion parameter in such a case to stabilize the control.

REFERENCE SIGNS LIST 1 air flow sensor
10 three-way catalyst
100 engine
11 electronically controlled wastegate valve
12 accelerator opening degree sensor
13 injector
14 intake pressure sensor
15 cylinder
16 exhaust pipe
17 ignition plug
18 piston
19 In-cylinder pressure sensor
2 electronically controlled throttle
20 ECU
201 wall surface temperature calculation unit
202 combustion control unit
21 intake valve
22 exhaust valve
40 EGR pipe
41 EGR valve
42 EGR cooler
43 differential pressure sensor
44 EGR temperature sensor
4a compressor
4b turbine
5 variable valve timing
5a variable valve timing mechanism
6 intake pipe
7 intercooler
9 air-fuel ratio sensor

The invention claimed is:

1. An internal combustion engine control device controlling an internal combustion engine that injects fuel into a cylinder and generates combustion by ignition, the internal combustion engine control device comprising a processor, wherein the processor is configured to:
   calculate a wall surface temperature of the cylinder based on a pressure in the cylinder; and
   control combustion of the internal combustion engine based on the calculated wall surface temperature.

2. The internal combustion engine control device according to claim 1, wherein
   the processor corrects a combustion parameter to be used for at least one of injection and ignition in the combustion based on the wall surface temperature.

3. The internal combustion engine control device according to claim 2, wherein
   the processor measures the wall surface temperature every cycle and determines the combustion parameter in a next cycle based on the wall surface temperature.

4. The internal combustion engine control device according to claim 3, wherein
   the processor changes a fuel injection timing of next and subsequent cycles based on a result obtained by comparing the wall surface temperature with a predetermined reference value.

5. The internal combustion engine control device according to claim 3, wherein
   the internal combustion engine injects fuel by splitting the injection into a plurality of times within one cycle, and
   the processor changes a number of fuel injections in one cycle based on a result obtained by comparing the wall surface temperature with a predetermined reference value.

6. The internal combustion engine control device according to claim 3, wherein
   the internal combustion engine injects fuel by splitting the injection into a plurality of times within one cycle, and
   the processor changes a ratio of fuel to be injected in each fuel injection during one cycle in next and subsequent cycles based on a result obtained by comparing the wall surface temperature with a predetermined reference value.

7. The internal combustion engine control device according to claim 3, wherein
   the processor changes an ignition timing of next and subsequent cycles based on a result obtained by comparing the wall surface temperature with a predetermined reference value.

8. The internal combustion engine control device according to claim 7, wherein
   the processor advances the ignition timing to a fuel consumption optimum point when the wall surface temperature is lower than the reference value.

9. The internal combustion engine control device according to claim 7, wherein
   the processor retards the ignition timing to a predetermined time at which knocking does not occur when the wall surface temperature is higher than the reference value.

10. The internal combustion engine control device according to claim 1, wherein
    in an expansion stroke, the processor estimates first parameters based on a difference between an actual measurement value of a workload calculated using results obtained by measuring in-cylinder pressures at a plurality of crank angles and a calculation value of a workload calculated based on a cooling loss and an assumption of adiabatic expansion including the first parameters, and calculates a wall surface temperature for each cycle based on the estimated first parameters.

11. The internal combustion engine control device according to claim 10, wherein
    the processor estimates the first parameter by a calculation that minimizes the difference between the actual measurement value of the workload and the calculation value of the workload.

12. The internal combustion engine control device according to claim 10, wherein
    the first parameters are a gas temperature at a start of expansion and a heat transfer coefficient between a gas and the wall surface.

13. The internal combustion engine control device according to claim 10, wherein
    the processor calculates the actual measurement value of the workload based on in-cylinder pressure measurement values measured at a plurality of crank angles and an in-cylinder volume set depending on a shape of a combustion chamber.

14. The internal combustion engine control device according to claim 11, wherein
the processor calculates the calculation value of the workload based on a specific heat ratio of a post-combustion gas calculated based on a measured in-cylinder pressure, a crank angle, an air-fuel ratio, and a mass of intake air, an in-cylinder pressure calculated assuming adiabatic expansion, and an in-cylinder volume set depending on a shape of a combustion chamber.

15. The internal combustion engine control device according to claim 2, wherein
the processor stops correcting the combustion parameter based on the wall surface temperature in a predetermined abnormal state that affects the calculation of the wall surface temperature.

16. An internal combustion engine control method for controlling an internal combustion engine that injects fuel into a cylinder and generates combustion by ignition, the internal combustion engine control method comprising:
calculating, by a processor, a wall surface temperature of the cylinder based on a pressure in the cylinder; and
controlling, by the processor, the combustion of the internal combustion engine based on the calculated wall surface temperature.

17. The method according to claim 16, further comprising:
estimating, by the processor, first parameters during an expansion stroke based on a difference between an actual measurement value of a workload calculated using results obtained by measuring in-cylinder pressures at a plurality of crank angles and a calculation value of a workload calculated based on a cooling loss and an assumption of adiabatic expansion including the first parameters; and
calculating a wall surface temperature for each cycle based on the estimated first parameters.

18. The method according to claim 16, further comprising correcting, by the processor, a combustion parameter to be used for at least one of injection and ignition in the combustion based on the wall surface temperature.

19. The method according to claim 18, further comprising:
measuring, by the processor, the wall surface temperature every cycle; and
determining the combustion parameter in a next cycle based on the wall surface temperature.

20. The method according to claim 19, further comprising changing, by the processor, a fuel injection timing of next and subsequent cycles based on a result obtained by comparing the wall surface temperature with a predetermined reference value.

* * * * *